US011351897B2

(12) United States Patent
Epaud et al.

(10) Patent No.: US 11,351,897 B2
(45) Date of Patent: Jun. 7, 2022

(54) VEHICLE SEAT

(71) Applicant: FAURECIA Sièges d'Automobile, Nanterre (FR)

(72) Inventors: David Epaud, Lardy (FR); Farouk Bouzid, Bretigny sur Orge (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/036,718

(22) Filed: Sep. 29, 2020

(65) Prior Publication Data

US 2021/0094452 A1    Apr. 1, 2021

(30) Foreign Application Priority Data

Sep. 30, 2019  (FR) ...................................... 1910838

(51) Int. Cl.
| | | |
|---|---|---|
| B60N 2/02 | (2006.01) | |
| B60N 2/04 | (2006.01) | |
| B60N 2/06 | (2006.01) | |
| B60N 2/10 | (2006.01) | |
| B60N 2/12 | (2006.01) | |
| B60N 2/68 | (2006.01) | |
| B60N 2/16 | (2006.01) | |
| B60N 2/30 | (2006.01) | |

(52) U.S. Cl.
CPC ................ B60N 2/68 (2013.01); B60N 2/06 (2013.01); B60N 2/1615 (2013.01); B60N 2/3011 (2013.01)

(58) Field of Classification Search
CPC ...... B60N 2/1615; B60N 2/3011; B60N 2/68; B60N 2/06
See application file for complete search history.

(56) References Cited

U.S. PATENT DOCUMENTS 4,971,395 A * 11/1990 Coussemacq .......... B60N 2/305
297/378.1
6,601,900 B1 * 8/2003 Seibold ................ B60N 2/0292
296/65.05

(Continued)

FOREIGN PATENT DOCUMENTS

| DE | 102008050468 B3 | 4/2010 |
|---|---|---|
| WO | 2008093197 A1 | 8/2008 |

OTHER PUBLICATIONS

French Search Report for French App. No. 1910838 dated May 18, 2020, BET200227 FR, 9 pages, No English Translation Available.

Primary Examiner — Shin H Kim
(74) Attorney, Agent, or Firm — Barnes & Thornburg LLP

(57) ABSTRACT

A vehicle seat, comprising: a lower frame, intended to be connected to the floor of a vehicle, having: a base, intended to be connected to the floor of the vehicle, and a seating portion frame, comprising at least two seating places to accommodate at least two users, a first backrest pivotally hinged to the base, a second backrest pivotally hinged to the base, wherein the seat further comprises a connection system connecting the first backrest to the seating portion frame, configured so that the pivoting of the first backrest relative to the base causes the simultaneous movement of the seating portion frame relative to the base in the longitudinal direction and the vertical direction of the seat, in the two pivoting directions of the first backrest relative to the base.

20 Claims, 11 Drawing Sheets

(56) References Cited

U.S. PATENT DOCUMENTS

| | | | | |
|---|---|---|---|---|
| 7,766,430 B2* | 8/2010 | Ventura | B60N 2/3013 | 297/378.1 |
| 7,802,850 B2* | 9/2010 | Dei | B60N 2/309 | 297/378.12 |
| 7,963,604 B2* | 6/2011 | Becker | B60N 2/12 | 297/341 |
| 8,308,238 B2* | 11/2012 | Imaoka | B60R 22/26 | 297/236 |
| 8,833,853 B2* | 9/2014 | Kim | B60N 2/1803 | 297/240 |
| 10,124,703 B2* | 11/2018 | Ecker | B60N 2/309 | |
| 10,661,683 B2* | 5/2020 | Becker | B60N 2/3011 | |
| 10,829,014 B2* | 11/2020 | Sivaraj | B60N 2/757 | |
| 2005/0269830 A1* | 12/2005 | Epaud | B60N 2/3031 | 296/65.09 |
| 2006/0061183 A1* | 3/2006 | White | B60N 2/986 | 297/378.12 |
| 2008/0203796 A1* | 8/2008 | Picker | B60N 2/305 | 297/341 |
| 2010/0007188 A1* | 1/2010 | Yamada | B60N 2/682 | 297/257 |
| 2010/0084903 A1 | 4/2010 | Kaemmerer | | |
| 2011/0031775 A1* | 2/2011 | Clor | B60N 2/305 | 296/66 |
| 2011/0316317 A1* | 12/2011 | Sprenger | B60N 2/3065 | 297/344.1 |
| 2012/0228910 A1 | 9/2012 | Kim | | |
| 2015/0306984 A1* | 10/2015 | Dill | B60N 2/3011 | 297/354.12 |
| 2015/0307005 A1* | 10/2015 | Dill | B60N 2/686 | 297/354.1 |
| 2016/0339810 A1* | 11/2016 | Pluta | B60N 2/01 | |
| 2017/0297458 A1* | 10/2017 | Pereira | B60N 2/01583 | |
| 2018/0079333 A1* | 3/2018 | Ma | B60N 2/3065 | |
| 2018/0147958 A1* | 5/2018 | Tarade | B60N 2/68 | |
| 2018/0257516 A1* | 9/2018 | Becker | B60N 2/3065 | |
| 2018/0281621 A1* | 10/2018 | Kaku | B60N 2/42754 | |
| 2018/0281634 A1* | 10/2018 | Furukawa | B60N 2/20 | |
| 2019/0092191 A1* | 3/2019 | Bouzid | B60N 2/309 | |
| 2020/0101872 A1* | 4/2020 | Epaud | B60N 2/3065 | |
| 2021/0094452 A1* | 4/2021 | Epaud | B60N 2/68 | |

* cited by examiner

VEHICLE SEAT

PRIORITY CLAIM

This application claims priority to French Patent Application No. FR 19 10838, filed Sep. 30, 2019, which is expressly incorporated by reference herein.

BACKGROUND

The present disclosure relates to a vehicle seat, particularly of a motor vehicle, configured to accommodate at least two users, as well as a vehicle bench seat equipped with such a seat, and also a vehicle equipped with such a bench seat.

The present disclosure relates to the field of vehicle seats configured to accommodate at least two users, in particular those which are part of a vehicle bench seat which generally comprises one or more seats and is intended to accommodate several users seated side by side, the bench seats being able to assume different configurations.

SUMMARY

According to the present disclosure, a vehicle seat is configured to accommodate at least two users which allows obtaining several configurations for the bench seat of which it is a part, and in particular the two configurations described above, while making it possible to switch simply and quickly from one configuration to another.

In illustrative embodiments, a vehicle seat is configured to accommodate at least two users, comprising:

a lower frame, intended to be connected to the floor of a vehicle, for example by means of connection means comprising in particular sliders, having:

a base, intended to be connected to the floor of the vehicle, for example by means of connection means comprising in particular sliders, and a seating portion frame, comprising at least two seating places to accommodate at least two users, having a front edge and a rear edge interconnected by a first side edge and a second side edge, a first backrest hinged to the base of the lower frame so as to pivot about a first transverse axis Y1 of the seat, extending along a first width portion of the seating portion frame in the transverse direction of the seat, and configured to pivot relative to the base about the first transverse axis Y1 between at least one raised position and a folded position, a second backrest hinged to the base of the lower frame so as to pivot about a second transverse axis Y1' of the seat, which in particular may be coincident with the first transverse axis Y1, the second backrest extending along a second width portion of the seating portion frame in the transverse direction of the seat, and configured to pivot relative to the base about the second transverse axis Y1' between at least one raised position and a folded position.

In illustrative embodiments, the seat further comprises a first connection system connecting the first backrest to the seating portion frame, configured so that the pivoting of the first backrest relative to the base about the first transverse axis Y1 between the at least one raised position and the folded position causes the simultaneous movement of the seating portion frame relative to the base in the longitudinal direction X and the vertical direction Z of the seat between a first position and a second position, in the two pivoting directions of the first backrest relative to the base, about the first transverse axis Y1 of the seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
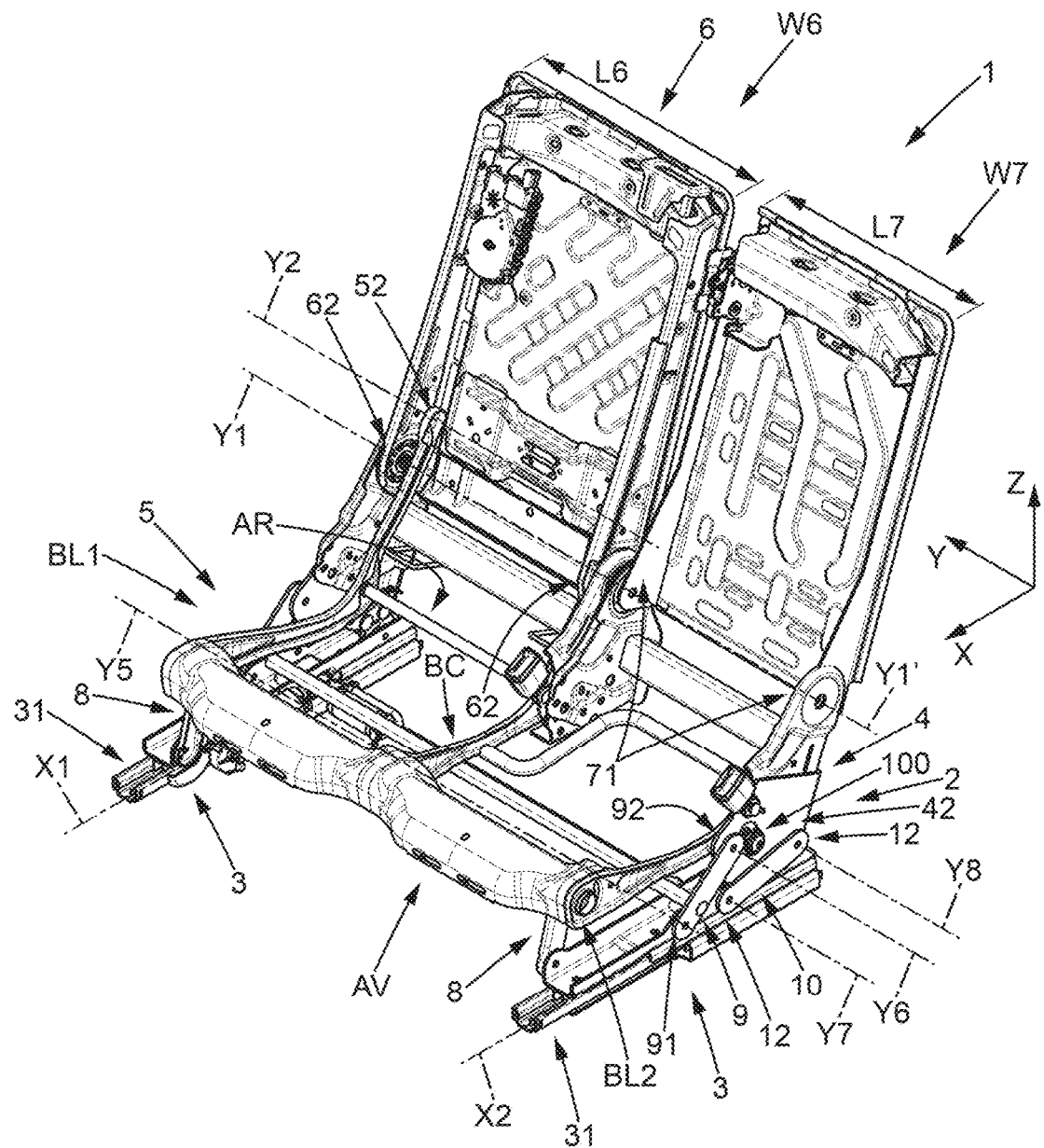
FIG. 1 shows a perspective view of a seat according to one embodiment of the present disclosure, in a first configuration.

For the most part, the drawings and the description below contain elements which are certain in nature. Therefore not only can these serve to provide a better understanding of the present disclosure, they also contribute to its definition where appropriate.

Throughout this application, the spatial directions are defined as follows:

the longitudinal direction X of the seat corresponds to the sliding direction of the seat relative to the floor of the vehicle along sliders, when the seat comprises sliders as means of connection to the floor of the vehicle, received on the lower frame of the seat, as shown in the exemplary embodiments of FIGS. 1 to 6, the vertical direction Z of the seat corresponds to the direction perpendicular to the plane of the floor of the vehicle to which the seat is fixed, also perpendicular to the longitudinal direction of the seat, defined above, as shown in the exemplary embodiments of FIGS. 1 to 6, the transverse direction Y of the seat is the direction perpendicular to the longitudinal direction and to the vertical direction, as shown in the exemplary embodiments of FIGS. 1 to 6.

An axis is defined as a straight line in a determined direction, and possibly directional. For example, a longitudinal axis is an axis along the longitudinal direction.

Also, front and rear are understood in relation to the longitudinal direction of the seat, with an orientation from the rear edge of the lower frame, where a seat backrest is hinged, towards the front edge of the lower frame.

Similarly, upper and lower are understood in relation to the vertical direction of the seat, with an orientation from the means connecting the lower frame of the seat to the floor of the vehicle, and in particular the sliders, towards the seat backrest.

Finally, throughout the present application, substantially longitudinal, transverse, or vertical, is understood to mean an orientation at an angle of less than 30°, which can advantageously be zero, relative to the longitudinal direction, vertical direction, or transverse direction.

Similarly, substantially parallel is understood to mean an orientation at an angle of less than 30°, which can advantageously be zero, relative to a given element.

The present disclosure relates to a vehicle seat 1 configured to accommodate at least two users, comprising:

a lower frame 2, intended to be connected to the floor of a vehicle, for example by connection means 3 comprising in particular sliders 31, having:

a base 4, intended to be connected to the floor of the vehicle, for example by connection means (3) comprising in particular sliders (31), and a seating portion frame 5 comprising at least two seating places to accommodate at least two users, having a front edge AV and a rear edge AR interconnected by a first side edge BL1 and a second side edge BL2, a first backrest 6 hinged to the base 4 of the lower frame 2 so as to pivot about a first transverse axis Y1 of the seat 1, extending along a first width portion W6 of the seating portion frame 5 in the transverse direction Y of the seat 1, and configured to pivot relative to the base 4 about the first transverse axis Y1 between at least one raised position and a folded position, a second backrest 7 hinged to the base 4 of the lower frame 2 so as to pivot about a second transverse axis Y1' of the seat 1, able in particular to be coincident with the first transverse axis Y1, the second backrest 7 extending along a second width portion W7 of the seating portion frame 5 in the transverse direction Y of the seat 1, and configured to pivot relative to the base 4 about the second transverse axis Y1' between at least one raised position and a folded position.

According to the present disclosure, the seat further comprises a first connection system 51 connecting the first backrest 6 to the seating portion frame 5, configured so that the pivoting of the first backrest 6 relative to the base 4 about the first transverse axis Y1 between the at least one raised position and the folded position causes the simultaneous movement of the seating portion frame 5 relative to the base 4 in the longitudinal direction X and vertical direction Z of the seat between a first position and a second position, and in the two pivoting directions of the first backrest 6 relative to the base 4, about the first transverse axis Y1 of the seat 1.

Figure 2:
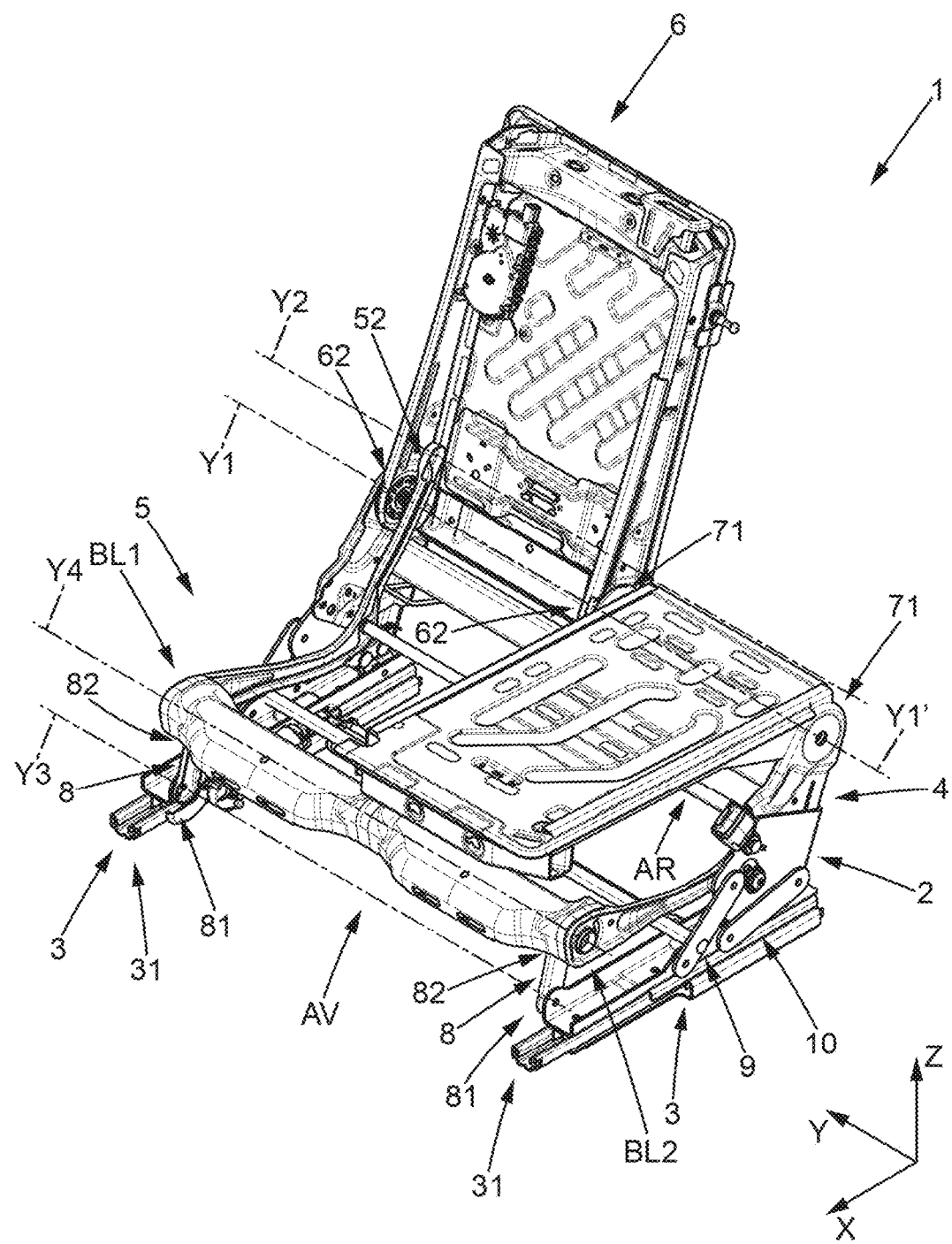
FIG. 2 shows a perspective view of the seat of FIG. 1, in a second configuration.
Figure 3:
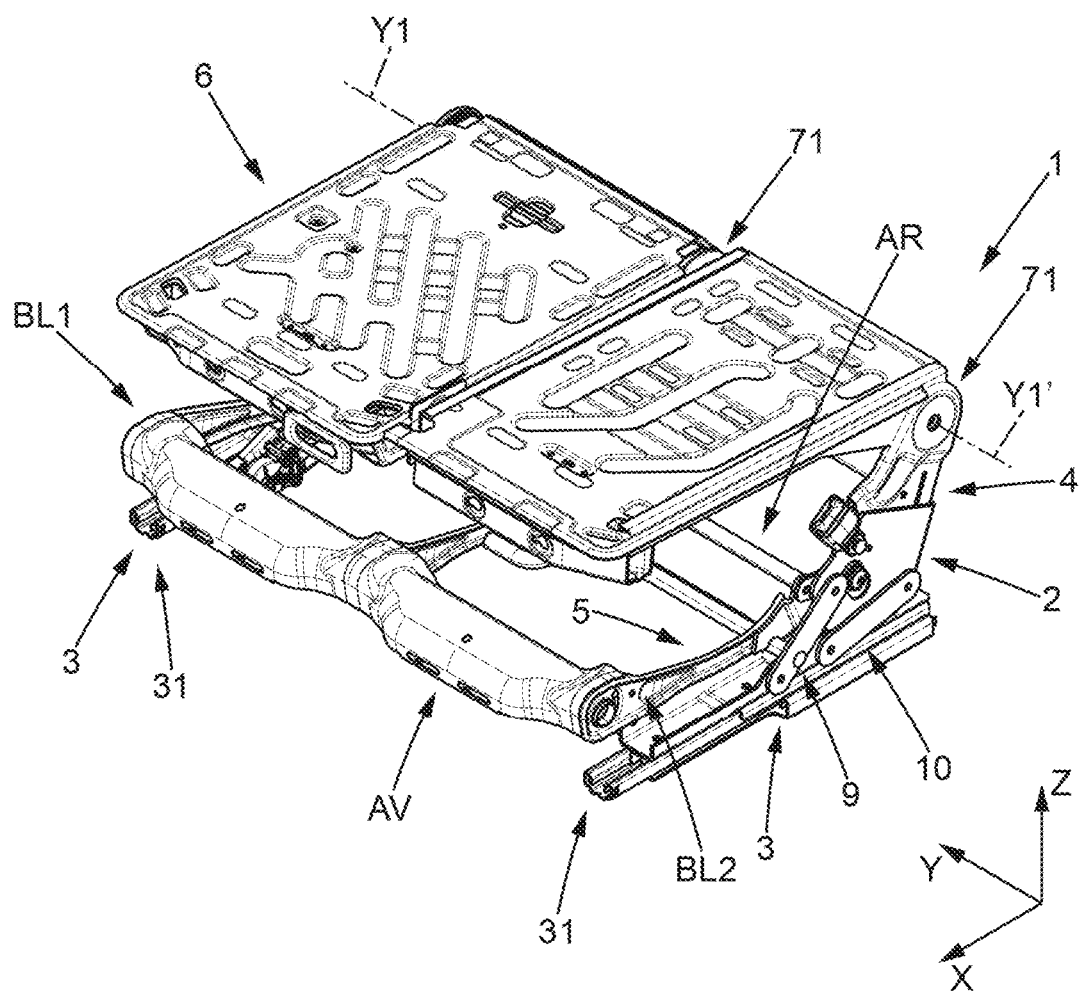
FIG. 3 shows a perspective view of the seat of FIG. 1, in a third configuration.

Thus, as can be seen in the exemplary embodiments of FIGS. 1 to 3, with the seat 1 of the present disclosure it is possible to envisage different configurations for the seat 1, and for a bench seat comprising the seat 1 of the present disclosure.

In particular, a first configuration may be provided, called nominal, visible for example in the embodiment of FIG. 1, in which the first backrest 6 and the second backrest 7 are in their raised position, in other words a position in which the first backrest 6 and the second backrest 7 are oriented in a direction substantially parallel to the vertical direction Z of the seat 1, and the seating portion frame 5, and in particular its front edge AV, is at a distance from the floor of the vehicle with an orientation in a direction substantially parallel to the longitudinal direction X of the seat 1, the seating portion frame 5 being in the first position.

Such a nominal configuration is provided to enable the seat 1 to receive at least two users in a seated position, side by side on the seat 1.

A second configuration may also be provided, called single fold, visible for example in the embodiment of FIG. 2, in which only the first backrest 6 is in its raised position while the second backrest 7 is in its folded position, in other words a position in which the second backrest 7 is brought close to the seating portion frame 5 so as to be oriented in a direction substantially parallel to the longitudinal direction X of the seat 1, while the seating portion frame 5, and in particular its front edge AV, remains distanced from the means of connection 3 to the floor of the vehicle with an orientation substantially parallel to the longitudinal direction X of the seat 1, in the first position.

The pivoting of the second backrest 7 relative to the base 4 about the first transverse axis Y1', between its raised position and its folded position, did not cause movement of the seating portion frame 5 relative to the base 4, the first connection system 51 advantageously not being connected to the second backrest 7, as can be seen more particularly in the exemplary embodiments of FIGS. 1, 4, 6, 8 and 9.

Such a single fold configuration corresponds to the second configuration described in the introductory part of the present application, and may be provided in the case where the bench seat receiving the seat 1 defines a separation between the trunk of the vehicle and the passenger compartment of the vehicle receiving the bench seat, and it is necessary to provide access between the trunk and the passenger compartment, for example to be able to transport long objects such as wooden boards or skis, which are placed in the trunk but protrude into the passenger compartment, this access being provided at the second backrest 7 while enabling at least one user to sit on the bench seat by being received on the lower frame 2 and on the first backrest 6.

A third configuration may also be provided, called dive down, visible for example in the exemplary embodiment of FIG. 3, in which the first backrest 6 and the second backrest 7 are both in their folded position, in other words a position in which the first backrest 6 and the second backrest 7 are brought close to the seating portion frame 5 so as to be oriented in a direction substantially parallel to the longitudinal direction X of the seat 1, while the seating portion frame 5, and in particular its front edge AV, is brought closer to the floor of the vehicle in comparison to the nominal and single fold configurations, while being tilted relative to the longitudinal direction X of the seat. The seating portion frame 5 is then in the second position, having been driven by the first backrest 6 via the first connection system 51.

Such a dive down configuration corresponds to the first configuration described in the introductory part of the present application, and makes it possible for example to increase the effective cargo volume in the vehicle receiving the bench seat with the seat 1 according to the present disclosure, and without any user being able to sit on the seat 1.

With the seat 1 according to the present disclosure, to transition from the nominal configuration to the single fold configuration, it is sufficient to pivot the second backrest 7 relative to the base 4 about the first transverse axis Y1 of the seat 1, for example by means of manual action by a user or else by means of an actuator, for example an electric motor.

Also, with the seat 1 according to the present disclosure, to transition from the nominal configuration to the dive down configuration, it is sufficient to pivot only the first backrest 6 relative to the base 4 about the first transverse axis Y1 of the seat 1, for example by means of manual action by a user or else by means of an actuator, for example an electric motor, so as to bring it closer to its folded position which causes, by means of the first connection system 51, movement of the seating portion frame 5 relative to the base 4 from the first position to the second position, and without causing the second backrest 7 to pivot relative to the base 4 about the second transverse axis Y1', which must then be driven simultaneously or subsequently, for example by means of manual action by a user or else by means of an actuator, for example an electric motor.

In a similar manner, with the seat 1 according to the present disclosure it is possible to transition from the single fold configuration to the dive down configuration by pivoting only the first backrest 6 relative to the base 4 about the first transverse axis Y1 of the seat 1, for example by means of manual action of a user or else by means of an actuator, for example an electric motor, so as to bring it closer to its folded position which, by means of the first connection system 51, simultaneously causes movement of the seating portion frame 5 relative to the base 4 from the first position to the second position, and without causing the second backrest 7 to pivot relative to the base 4 about the second transverse axis Y1', the latter not being connected to the first connection system 51.

Thus, with the seat 1 according to the present disclosure, it is possible to envisage at least three different configurations for a bench seat of which the seat 1 is a part, while being able to switch quickly and simply from one configuration to another, which represents a greater number of different conceivable configurations than for the second bench seat design described in the introduction to the present application.

Also, although the number of different conceivable configurations for the bench seat receiving the seat 1 according to the present disclosure is less than the number of different conceivable configurations with the first design described in the introduction to the present application, a bench seat comprising a seat 1 according to the present disclosure will have a reduced cost price compared to this second design, and a simplified design which also makes it possible to switch quickly and easily from one configuration to another.

The various configurations described above that are conceivable with a bench seat receiving a seat 1 according to the present disclosure are configurations sufficient to meet most of the usage requirements of a vehicle, and in particular a motor vehicle, concerning the transport of passengers or objects in the vehicle.

Figure 9:
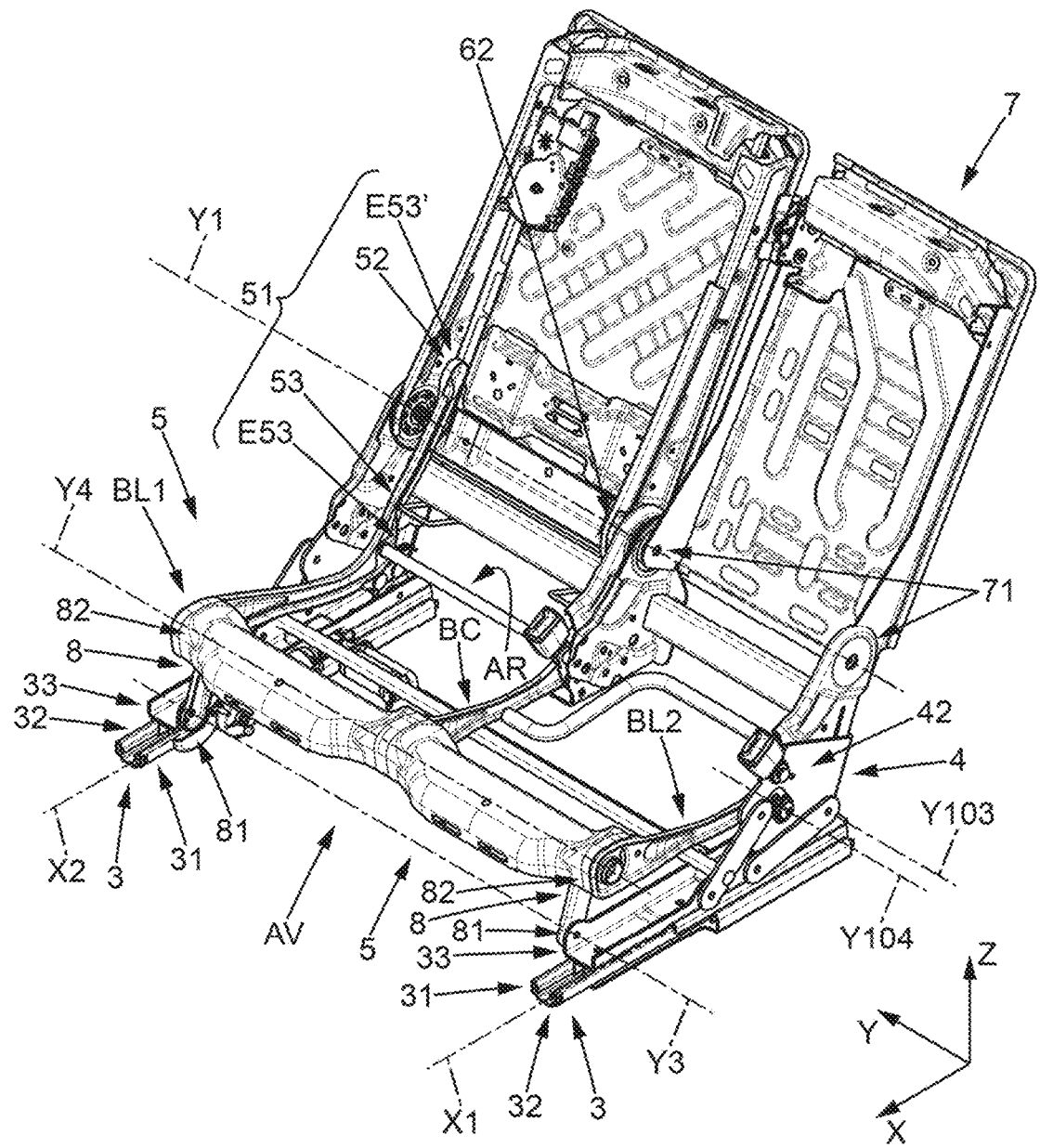
FIG. 9 shows a perspective view of the seat of FIG. 1, in a sixth configuration.
Figure 10:
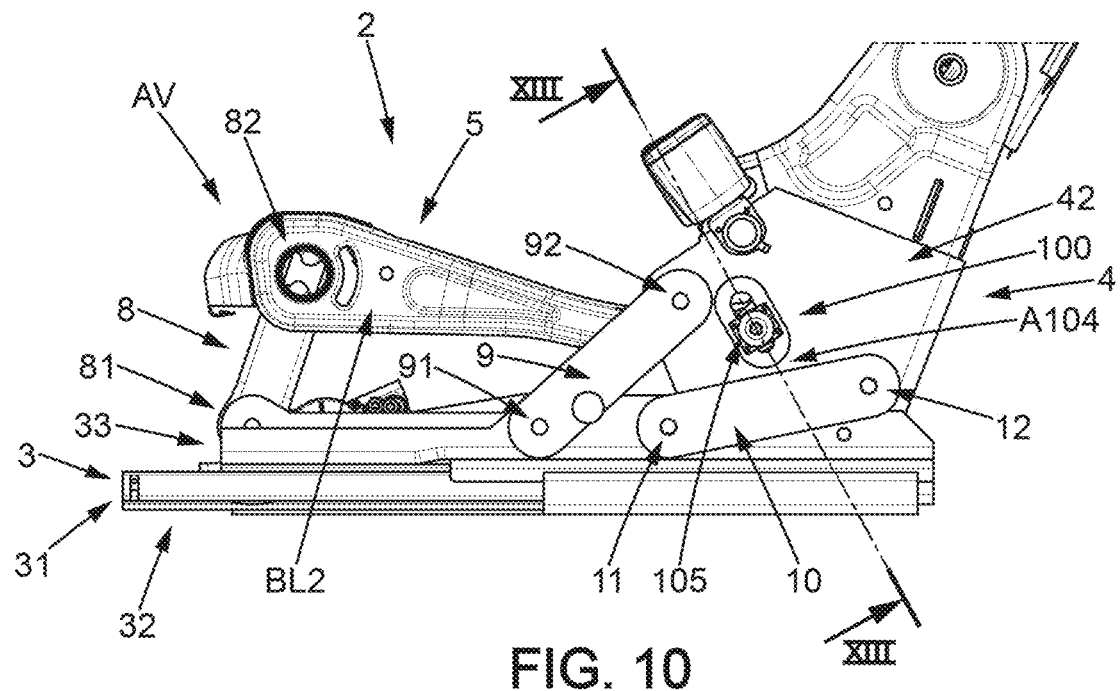
FIG. 10 shows a detailed side view of the seat of FIG. 9.
Figure 11:
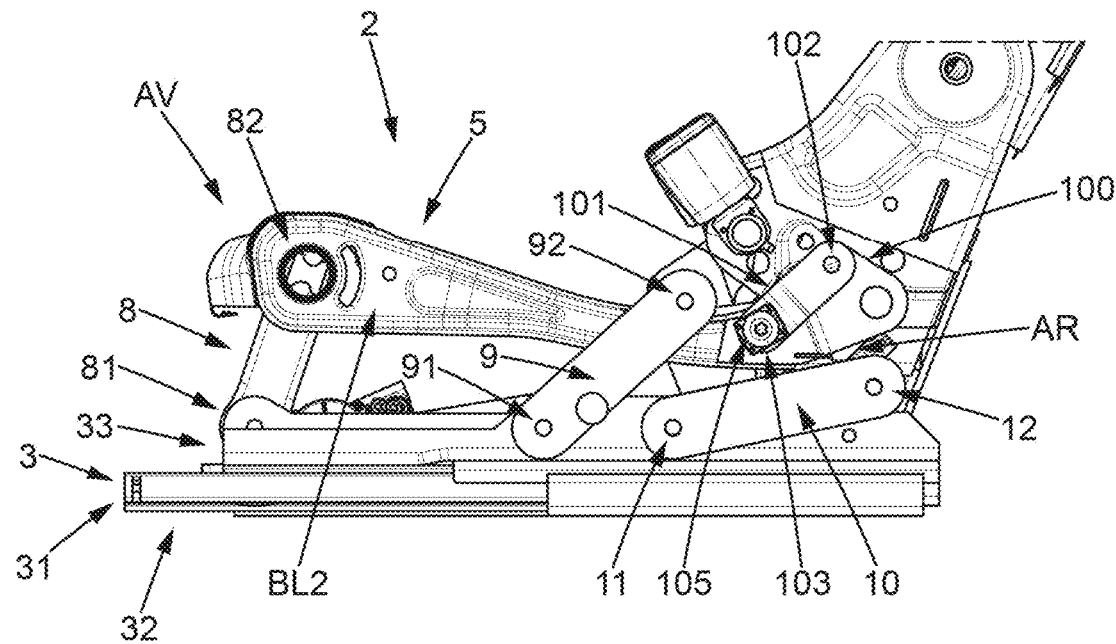
FIG. 11 shows a detailed side view of the seat of FIG. 9, in which a side flange of the base has been removed.
Figure 12:
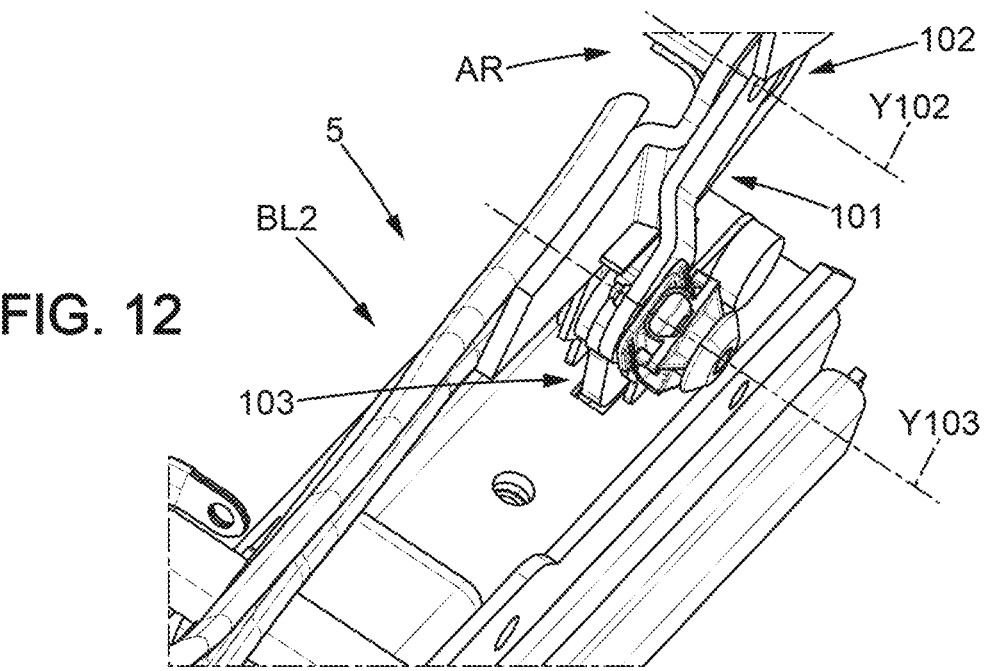
FIG. 12 shows a detailed perspective view of the seat of FIG. 11.

As can be seen in the exemplary embodiment of FIGS. 9 to 11, a fourth configuration may be provided, called comfort, in which at least the first backrest 6, and advantageously the second backrest 7, are tilted rearwards relative to their raised position, by an angle of between 10° and 30°, for example substantially equal to 15°, and in which the front edge AV of the seating portion frame 5 is offset rearward along the longitudinal direction X of the seat 1, relative to the first position of the seating portion frame 5, while remaining distanced from the floor of the vehicle.

This configuration makes it possible to offer at least one of the two users of the seat 1 of the present disclosure a position in which he or she is more reclined than in the nominal configuration, which is more comfortable.

With the seat 1 according to the present disclosure, to transition from the nominal configuration to the comfort configuration, it is sufficient to pivot the first backrest 6 relative to the base 4 about the transverse axis Y1 of the seat 1, rearward relative to its raised position, for example by means of manual action by a user or else by means of an actuator, for example an electric motor, which causes, due to the first connection system 51, the rearward movement of the seating portion frame 5 relative to the base 4 along the longitudinal direction X of the seat 1, from the first position, and without causing the second backrest 7 to pivot relative to the base 4 about the second transverse axis Y1', it not being connected to the first connection system 51. It is then necessary to cause the second backrest 7 to pivot relative to the base 4, about the second transverse axis Y1', simultaneously or subsequently, for example by means of manual action of a user or else by means of an actuator, for example an electric motor.

Advantageously, and as can be seen in the exemplary embodiments of FIGS. 1 to 3, the first transverse axis Y1 where the first backrest 6 pivots in relation to the base 4 may be coincident with the second transverse axis Y1' where the second backrest 7 pivots in relation to the base 4.

Alternatively, and without departing from the scope of the present disclosure, the first transverse axis Y1 and the second transverse axis Y1' could be distanced from one another.

Advantageously, the seat 1 according to the present disclosure may be configured to accommodate two and only two users, the seating portion frame 5 then comprising two and only two seating places to accommodate two and only two users.

Advantageously, the first connection system 51 can only connect the first backrest 6 to the seating portion frame 5, no link then existing between the second backrest 7 and the seating portion frame 5.

Thus, and advantageously, the second backrest 7 may be configured to pivot relative to the base 4 about the second transverse axis Y1', independently of the movement of the seating portion frame 5 relative to the base 4 in the longitudinal direction X and the vertical direction Z, driven, by means of the first connection system 51, by the pivoting of the first backrest 6 relative to the base 4 about the first transverse axis Y, at least to enable the second backrest 7 to be folded down from the at least one raised position to the folded position with the first backrest 6 remaining in the raised position, and without causing the simultaneous movement of the seating portion frame 5 relative to the base 4.

The pivoting movement of the first backrest 6 relative to the base 4 about the first transverse axis Y1 is therefore independent of and mechanically decoupled from the pivoting movement of the second backrest 7 relative to the base 4 about the second transverse axis Y1'.

According to one embodiment, the second backrest 7 is in particular connected to the base 4 via a second connection system 71, configured so that the movement of the second backrest 7 relative to the base 4 is independent of and decoupled from the movement of the seating portion frame 5 relative to the base 4.

To this end, and as can be seen for example in the exemplary embodiments of FIGS. 1 to 6, the second connection system 71 may for example only comprise a pivoting connection along the second transverse axis Y1' of the seat 1, between the second backrest 7 and the base 4.

Thus, thanks to this advantageous arrangement of the present disclosure, the second backrest 7 is connected to the base 4 solely by means of the second connection system 71 and is therefore entirely decoupled from the seating portion frame 5, such that the movement of the second backrest 7 relative to the base 4 does not cause movement of the seating portion frame 5 relative to the base 4.

Advantageously, the pivoting connection between the second backrest 7 and the base 4 along the second transverse axis Y1' of the seat 1 may incorporate an electric actuator, in particular an electric motor, configured to cause the second backrest 7 to pivot relative to the base 4 about the second transverse axis Y1' of the seat 1.

The pivoting connection between the second backrest 7 and the base 4 along the second transverse axis Y1' of the seat 1 may further comprise a locking means, advantageously integrated into the pivoting connection, or even integrated into the electric actuator, and configured to lock the tilt of the second backrest 7 relative to the base 4 about the second transverse axis Y1'.

Additionally or alternatively, a means may be provided for locking the tilt of the second backrest 7 relative to the base 4 about the second transverse axis Y1', actuated manually or electrically, configured to lock the tilt of the second backrest 7 relative to the base 4 about the second transverse axis Y1', by creating a rigid connection between the second backrest 7 and the frame of the vehicle.

According to one embodiment, the first connection system 51 between the first backrest 6 and the seating portion frame 5 comprises a pivoting connection 52 along a third transverse axis Y2 of the seat, distinct from the first transverse hinging axis Y1 between the first backrest 6 and the base 4, connecting the first backrest 6 and the seating portion frame 5, near its rear edge AR.

According to one embodiment, the first connection system 51 comprises a tab 53 provided on the seating portion frame 5, projecting from the rear edge AR of the seating portion frame 5, the tab having two longitudinal ends E53, E53', with:

a first longitudinal end E53 integral to the seating portion frame 5, at the rear edge AR of the seating portion frame 5, and a second longitudinal end E53' connected to the first backrest 7 by means of the pivoting connection 52 along the third transverse axis Y2 of the seat.

Figure 6:
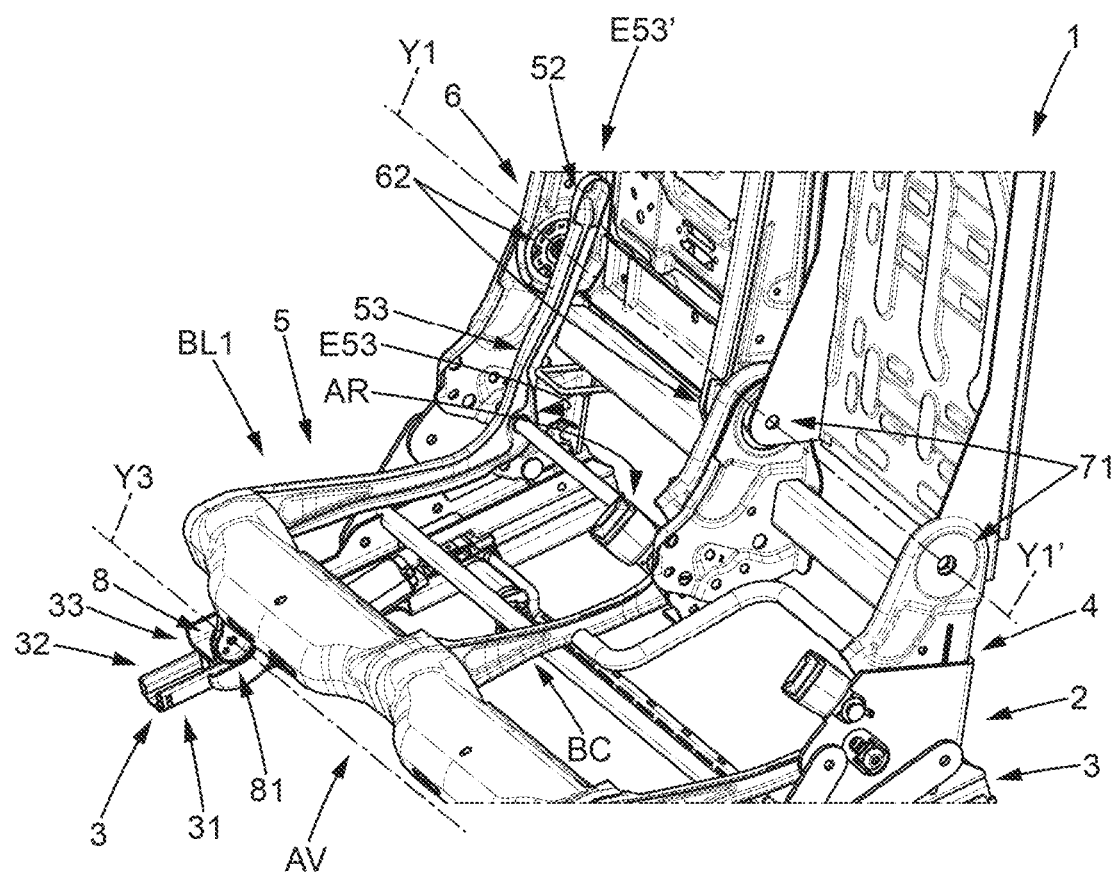
FIG. 6 shows a detailed perspective view of the seat of FIG. 1.
Figure 7:
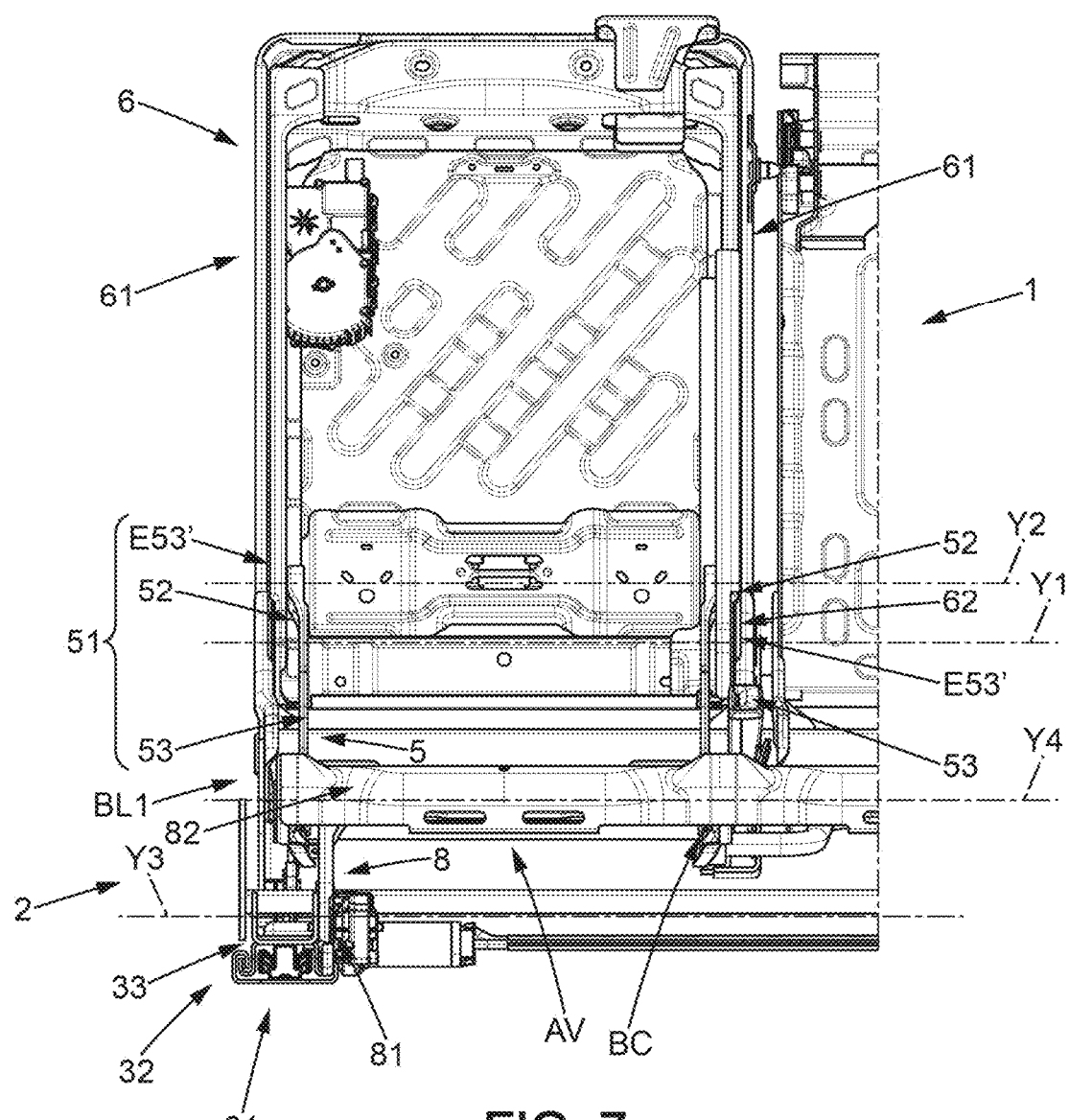
FIG. 7 shows a detailed front view of the seat of FIG. 1.
Figure 8:
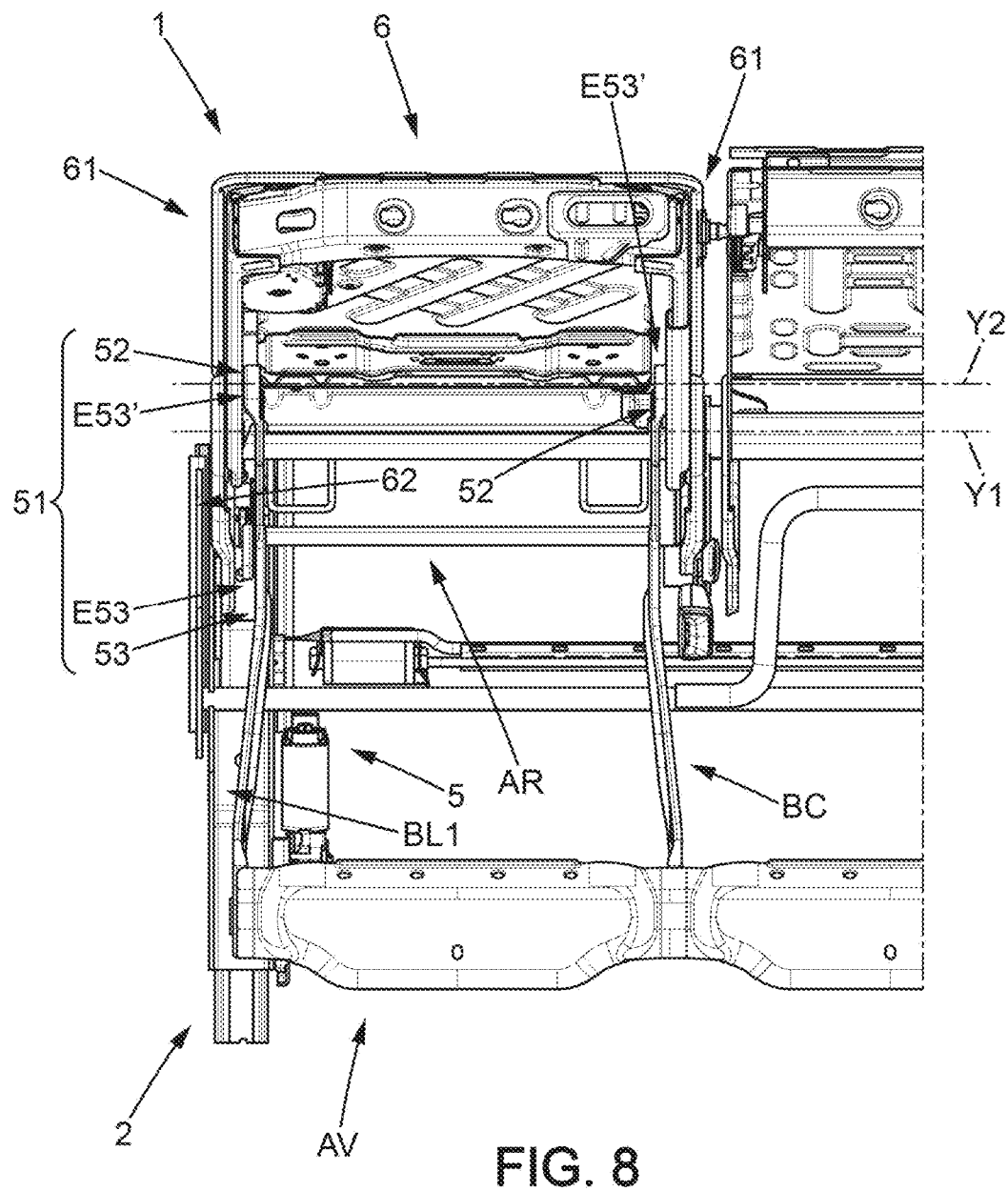
FIG. 8 shows a detailed top view of the seat of FIG. 1.

Advantageously, and as can be seen in the exemplary embodiments of FIGS. 6, 7 and 8, the tab 53 is provided as one piece and integral with the first side edge BL1 of the seating portion frame 5, and may be substantially rectilinear. The tab 53 may also be configured to extend substantially parallel to the first backrest 6 in the nominal configuration.

According to one embodiment, the seating portion frame 5 has a central edge BC, substantially parallel to the first side edge BL1 and to the second side edge BL2 of the seating portion frame 5, and interposed between the first side edge BL1 and the second side edge BL2 along the transverse direction Y of the seat 1, and positioned so that the first width portion W6 extends substantially between the first side edge BL1 and the central edge BC of the seating portion frame 5 and so that the second width portion W7 extends substantially between the central edge BC and the second side edge BL2 of the seating portion frame 5.

As can be seen in the exemplary embodiment of FIG. 1, such a central edge BC, interposed between the first side edge BL1 and the second side edge BL2, stiffens the seating portion frame 5.

Also, the first connection system 51 may have two tabs 53, each projecting respectively from the first side edge BL1 and the central edge of the seating portion frame BC, defining the first width portion W6, the second longitudinal end E53' of the tabs 53 each being connected to the first backrest by means of a separate pivoting connection 52 along the third transverse axis Y2 of the seat, each at a separate side flange 61 of the first backrest 6.

This advantageous arrangement of the present disclosure makes it possible to distribute the force exerted by the first backrest 6 on the first connection system 51 in order to minimize the risks of deformation or even damage to the seating portion frame 5 in the event of significant stresses.

Advantageously, the two tabs 53 may be substantially identical and substantially parallel, in order to facilitate the manufacture of the seating portion frame 5 of the seat 1 according to the present disclosure.

According to one embodiment, each tab 53 is made as one piece with and integral with respectively the first side edge BL1 and the central edge BC of the seating portion frame 5.

As can be seen in the exemplary embodiments of FIGS. 1 to 8, the second longitudinal end E53' of the tab 53, and therefore the pivoting connection 52, may be positioned such that the third transverse axis Y2 is located above the first transverse axis Y1, in the vertical direction Z of the seat 1.

In particular, the distance separating the first transverse axis Y1 from the third transverse axis Y2 may be between 50 cm and 70 cm.

Thus, the lever arm between the first transverse axis Y1 and the second transverse axis Y2 is sufficient for the pivoting of the first backrest 6 relative to the base 4 to cause movement of the seating portion frame 5 relative to the base 4, by means of the first connection system 51, with limited force exerted on the first backrest 6.

According to one embodiment, the lower frame 2 further has connection means 3, configured to connect the lower frame 2 to the floor of the vehicle.

Advantageously, the connection means 3 comprise for example two sliders 31, arranged one on either side of the lower frame 2, each extending along a longitudinal axis X1, X2 of the seat 1 and configured to allow movement in translation of the seat 1 relative to the floor of the vehicle in the longitudinal direction X of the seat 1.

As can be seen more particularly in the embodiments of FIGS. 6 and 7, each slider 31 may include a lower section 32, configured to be fixed to the floor of the vehicle by means of attachment means (not shown), the lower section 32 slidingly receiving an upper section 33.

According to one embodiment, the seating portion frame 5 may be connected to the connection means 3 by at least one connecting rod 8 having two longitudinal ends 81, 82, wherein the first longitudinal end 81 of the connecting rod 8 is hinged to the connection means 3 so as to pivot about a fourth transverse axis Y3 of the seat and the second longitudinal end 82 of the connecting rod 8 is hinged to the seating portion frame 5, at its front edge AV, so as to pivot about a fifth transverse axis Y4 of the seat 1.

According to such an embodiment:

the forward pivoting of the first backrest 6 relative to the base 4 about the first transverse axis Y1 of the seat 1 causes the forward pivoting of the connecting rod 8 about the fourth transverse axis Y3 of the seat 1 so as to move the front edge AV of the seating portion frame 5 relative to the connection means 3, in the vertical direction Z of the seat 1, and vice versa, the rearward pivoting of the first backrest 6 relative to the base 4 about the first transverse axis Y1 of the seat 1 causes the rearward pivoting of the connecting rod 8 about the fourth transverse axis Y3 of the seat 1 so as to move the front edge AV of the seating portion frame 5 relative to the connection means 3, in the vertical direction Z of the seat 1. The rotation of the connecting rod 8 relative to the seating portion frame 5 and relative to the connection means 3, causes the movement of the front edge AV of the seating portion frame 5 relative to the connection means 3 and relative to the base 4, simultaneously in the longitudinal direction X and in the vertical direction Z.

In particular, the at least one connecting rod 8 may be part of the first connection system 51 and cause the seating portion frame 5 to move relative to the floor of the vehicle, in the longitudinal direction X and the vertical direction Z of the seat 1, during the pivoting of the first backrest 6 relative to the base 4 about the first transverse axis Y1.

As can be seen in the exemplary embodiments of FIGS. 1, 2, 6 and 7, in the nominal configuration and in the single fold configuration, the connecting rod 8 may be arranged to be oriented substantially in the vertical direction Z of the seat 1, while in the dive down configuration, as can be seen in the exemplary embodiment of FIG. 3, the connecting rod 8 may be arranged to be oriented substantially in the longitudinal direction X of the seat 1, with the second longitudinal end 82 in front of the first longitudinal end 81, the front edge AV of the seating portion frame 5 being flush with the connection means 3, and advantageously with the floor of the vehicle receiving the seat 1.

As can be seen in the exemplary embodiment of FIGS. 9, 10 and 11, in the comfort configuration, the connecting rod 8 may be tilted rearward relative to the vertical direction Z of the seat 1, by an angle between 10° and 20°, so as to move the seating portion frame 5 rearward away from its first position, along the longitudinal direction X of the seat 1, and to bring it closer to the connection means 3, along the vertical direction Z seat 1.

As can be seen in the exemplary embodiments of FIGS. 1 to 9, the second longitudinal end 82 of the connecting rod 8 may be received on the first side edge BL1 or the second side edge BL2 of the seating portion frame 5, and as is more particularly visible in the exemplary embodiment of FIGS. 1 and 2, two connecting rods 8 may be provided, each connecting a separate side edge BL1, BL2 of the seating portion frame 5 to the connection means 3, and so as to ensure stability of the movement of the seating portion frame 5 relative to the connection means 3 and relative to the base 4.

The two connecting rods 8 may be substantially identical and intended to move substantially in parallel.

At least a third connecting rod 8 could optionally be provided, for example with its second longitudinal end 82 connected to the central edge BC of the seating portion frame 5, and in particular substantially identical to and intended to move substantially in parallel with the other two connecting rods 8.

The connecting rod 8 also makes it possible to connect the front edge AV of the seating portion frame 5 to the connection means 3, in order to allow absorption of the forces received by the seating portion frame 5, at its front edge AV, by the connection means 3.

According to one embodiment, the base 4 is mounted to be movable relative to the connection means 3 in the longitudinal direction X and the vertical direction Z of the seat 1, so that it is able to move closer to or away from the connection means 3.

It is thus possible to envisage other configurations for the seat 1 and for a bench seat comprising the seat 1.

Figure 4:
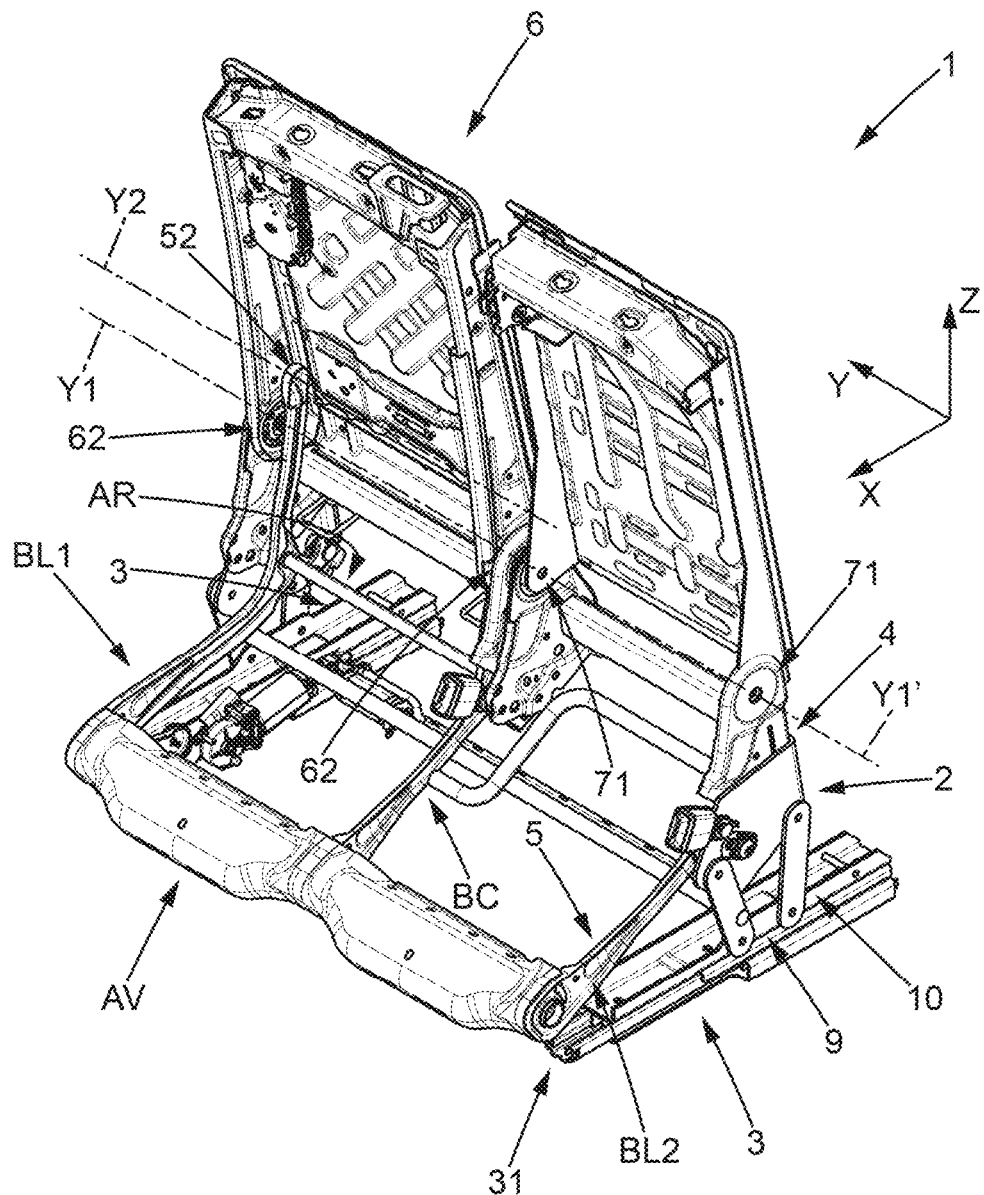
FIG. 4 shows a perspective view of the seat of FIG. 1, in a fourth configuration.

For example, as can be seen in the embodiment of FIG. 4, it is possible to envisage a so-called easy entry configuration, in which the base 4 is at a distance from the connection means 3, and therefore from the floor of the vehicle, in the vertical direction Z of the seat 1, in comparison to the nominal, single fold, and dive down configurations, in which the base 4 may be adjoining to the floor of the vehicle, and therefore to the connection means 3, and the first backrest 6 is pivoted forward relative to the base 4 about the first transverse axis Y1, between its raised position and its folded position, so as to drive the movement, by means of the first connection system 51, of the seating portion frame 5 towards its second position, similar to the position assumed in the dive down configuration, with its front edge AV flush with the floor of the vehicle and therefore with the connection means 3. The second backrest 7 may also be pivoted relative to the base 4 about the second transverse axis Y1', so as to be between its raised position and its folded position, and in particular so as to remain substantially parallel to the first backrest 6.

The movement of the base 4 relative to the connection means 3 may be driven manually by a user or by means of an actuator, for example an electric motor.

This so-called easy entry configuration makes it possible to free the space behind the seat 1, in particular to facilitate passage behind the seat 1, for example for users of the vehicle.

Figure 5:
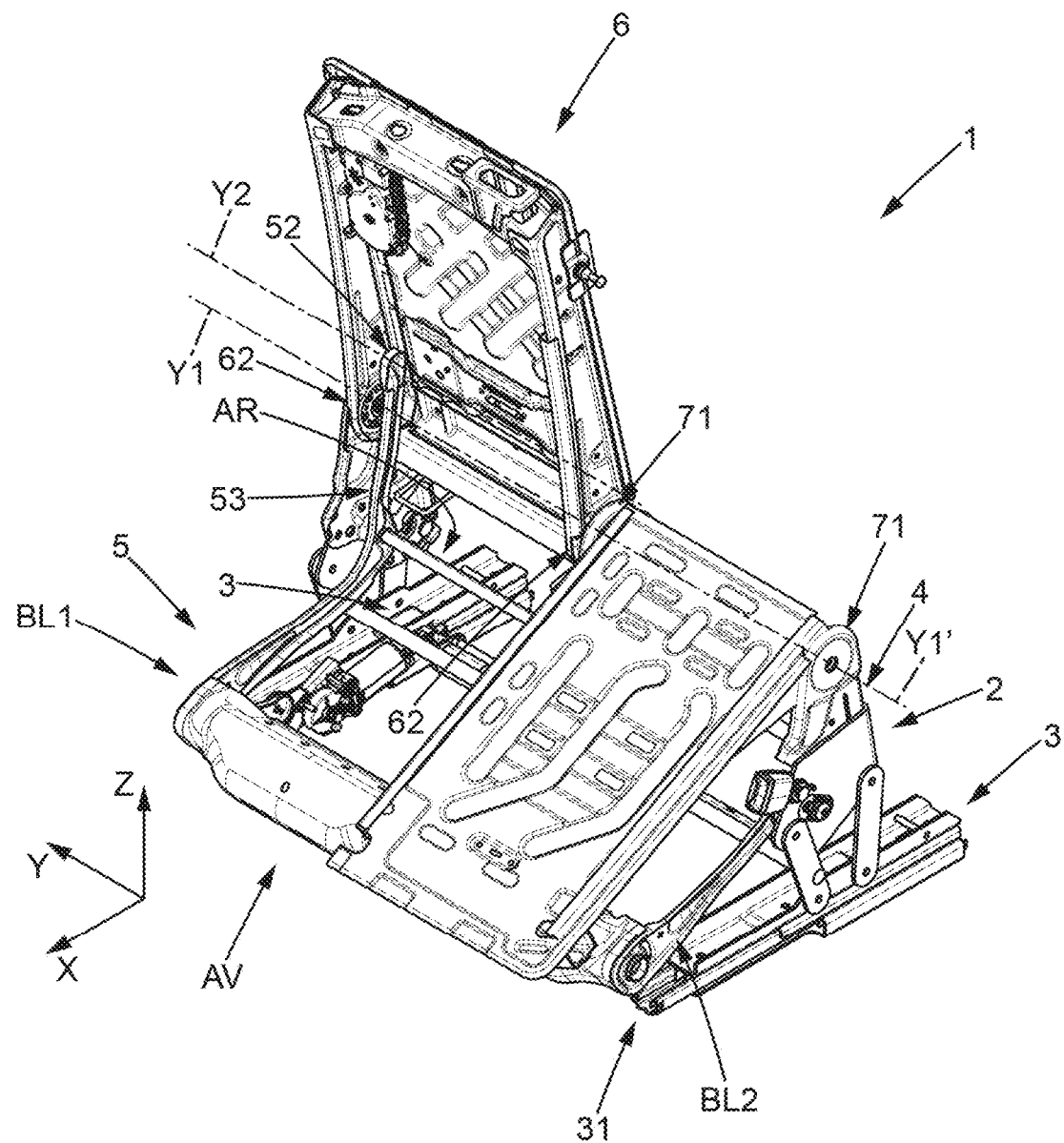
FIG. 5 shows a perspective view of the seat of FIG. 1, in a fifth configuration.

Also, as can be seen in the exemplary embodiment of FIG. 5, it is possible to envisage an easy entry 2 configuration, similar to the easy entry configuration described above, in which the first backrest 6, the seating portion frame 5, and the base 4 are in a position similar to the one in the easy entry configuration, while the second backrest 7 is in its folded down position.

This easy entry 2 configuration also makes it possible to free the space behind the seat 1 while maintaining an opening at the second backrest 7, for example for the passage of very long objects, as in the single fold configuration described above.

According to one embodiment, the base 4 is connected to the connection means 3 by at least two connecting rods 9, 10 aligned along a longitudinal axis X1, X2 of the seat 1, each connecting rod 9, 10 having two longitudinal ends 91, 92; 11, 12, wherein the first longitudinal end 91, 11 of each connecting rod 9, 10 is hinged to the connection means 3 so as to pivot respectively about a sixth transverse axis Y5 and a seventh transverse axis Y6 of the seat 1, and the second longitudinal end 92, 12 of each connecting rod 9, 10 is hinged to the base 4 so as to pivot respectively about an eighth transverse axis Y7 and a ninth transverse axis Y8 of the seat 1.

Advantageously, as can be seen in the exemplary embodiments of FIGS. 1 to 4, the connecting rods 9, 10 may be aligned with the connecting rod 8 connecting the seating portion frame 5 to the connection means 3.

Also, there may be provided: two connecting rods 9, in particular substantially identical and intended to move substantially in parallel, each arranged near a separate side edge BL1, BL2 of the seating portion frame 5; and two connecting rods 10, in particular substantially identical and intended to move substantially in parallel, each arranged near a separate side edge BL1, BL2 of the seating portion frame 5.

There could also be provided at least a third connecting rod 9 and at least a third connecting rod 10, in particular substantially identical to the other connecting rods 9 and to the other connecting rods 10 and intended to move substantially in parallel with the other connecting rods 9 and with the other connecting rods 10.

Advantageously, the first longitudinal end 81, 91, 11 of each connecting rod 8, 9 or 10 may be pivotally fixed on the upper section 33 of the slider 31.

According to one embodiment, the first width portion W6 has a width L6, in the transverse direction Y of the seat 1, that is strictly greater than the width L7 of the second width portion W7, in the transverse direction Y of the seat 1, preferably between 1.5 and 2.5 times greater.

Indeed, the first backrest 6 may be configured to be arranged closer to a side door of the vehicle receiving the seat 1 than the second backrest 7, while the second backrest 7 may be configured to be arranged substantially in the center of the vehicle receiving the seat 1, along a transverse direction of the vehicle (then substantially corresponding to the transverse direction Y of the seat 1).

This type of seat 1 is generally used for a bench seat, commonly called 40/20/40, comprising three seating places, and in which the width of the backrest in the transverse direction of the bench seat (corresponding to the transverse direction of at least one component seat of the bench seat), corresponding to the central seating place of the bench seat, represents substantially 20% of the total width of the bench seat in the transverse direction of the bench seat, while the width of the backrests in the transverse direction of the bench seat, corresponding to the side seating places of the bench seat, each represent substantially 40% of the total width of the bench seat in the transverse direction of the bench seat.

According to one embodiment, the seat 1 further comprises locking means 62 configured to lock the tilt of the first backrest 6 relative to the base 4 about the first transverse axis Y1 of the seat 1.

Advantageously, and as can be seen in the embodiments of FIGS. 1 to 9, the pivoting connection between the first backrest 6 and the base 4 along the first transverse axis Y1 of the seat 1 may incorporate an electric actuator, configured to cause the first backrest 6 to pivot relative to the base 4 about the first transverse axis Y1 of the seat 1.

The locking means 62 may advantageously also be integrated into the pivoting connection between the first backrest 6 and the base 4 along the first transverse axis Y1 of the seat 1, or even into the electric actuator.

Additionally or alternatively, the locking means 62 may include a manually or electrically actuated lock, configured to lock the tilt of the first backrest 6 relative to the base 4 about the first transverse axis Y1, by creating a rigid connection between the first backrest 6 and the frame of the vehicle.

According to one embodiment, the second width portion W7 of the seating portion frame 5 is connected to the base 4, at its rear edge, by means of a connection mechanism 100 configured to enable movement of the seating portion frame 5 relative to the base 4 in the longitudinal direction X and the vertical direction Z of the seat 1 during the movement of the seating portion frame 5 relative to the base 4 in the longitudinal direction X and the vertical direction Z of the seat 1.

The term rear edge AR is obviously understood to mean any element of the seating portion frame 5 positioned at the rear edge AR of the seating portion frame 5, whether it is for example a crossmember connected to the first BL1 or second BL2 side edge of the seating portion frame 5, or even an element integral with the first BL1 or second BL2 side edge, at the rear edge AR of the seating portion frame 5.

Thus, the forces received by the seating portion frame 5, and in particular at its rear edge AR, are absorbed along its entire width in the transverse direction Y of the seat 1, such that no part of the frame seat 5 is cantilevered relative to another.

Indeed, the forces received by the first width portion W6 of the seating portion frame 5, and in particular at the rear edge AR of the seating portion frame 5, may advantageously be absorbed by the first backrest 6, by means of the first connection system 51, while the forces received by the second width portion W7 of the seating portion frame 5, and in particular at the rear edge AR of the seating portion frame 5, are absorbed by the base 4, which is connected to the vehicle floor, via the connection mechanism 100.

In addition, unlike a connection between the second width portion W7 of the seating portion frame 5 and the base 4 at its rear edge AR, which would be a simple pivoting connection about a transverse axis of the seat 1 or else a rigid connection, the connection mechanism 100 allows movement of the seating portion frame 5 relative to the base 4 in the longitudinal direction X and the vertical direction Z of the seat 1, without causing movement of the second backrest 7 relative to the base 4, so as to enable obtaining different configurations of the seat 1, particularly those described above.

Figure 13:
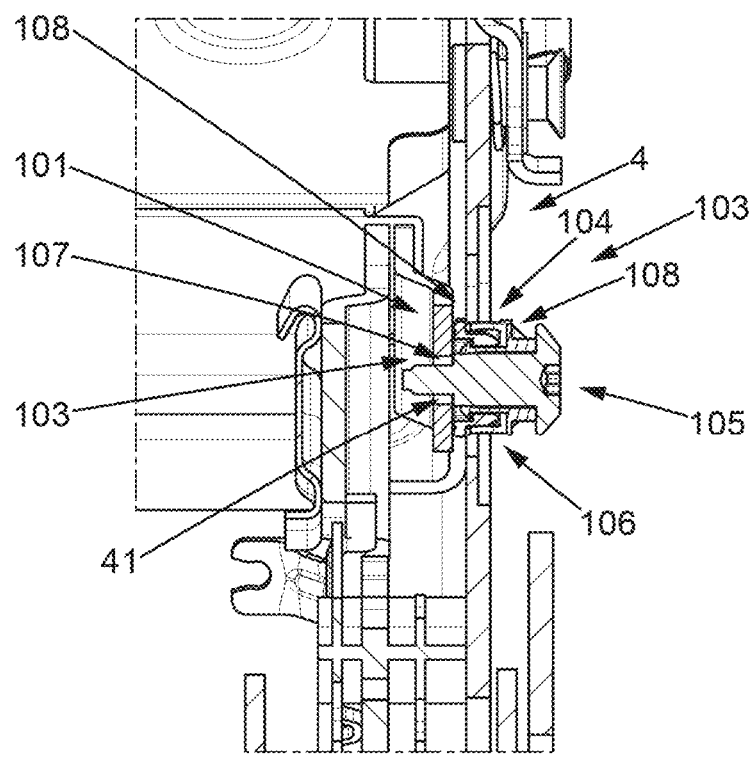
FIG. 13 shows a sectional view along line XIII-XIII of FIG. 10 of the seat of FIG. 9.

Advantageously, and as can be seen more particularly in the exemplary embodiments of FIGS. 9 and 13, the connection mechanism 100 is therefore not connected to the second backrest 7, to ensure that the pivoting of the second backrest 7 relative to the base 4 about the second transverse axis Y1' of the seat 1 is independent of and decoupled from the movement displacing the seating portion frame 5 relative to the base 4 in the longitudinal direction X and the vertical direction Z of the seat 1.

Indeed, the pivoting of the second backrest 7 relative to the base 4 about the second transverse axis Y1' of the seat 1 does not cause movement of the seating portion frame 5 relative to the base 4. Only the pivoting of the first backrest 6 about the first transverse axis Y1 of the seat 1 causes movement of the seating portion frame 5 relative to the base 4, in the longitudinal X or vertical Z direction of the seat 1, because the first connection system 51 is not connected to the second backrest 7. The connection mechanism 100 thus allows independent and decoupled movement relative to the base 4, between the seating portion frame 5 and the second backrest 7.

The movement of the seating portion frame 5 relative to the base 4, caused by the pivoting of the first backrest 6 relative to the base 4, therefore does not cause any movement of the second backrest 7 relative to the base 4.

Also, in the case where the first connection system 51 comprises at least one pivoting connection 52 connected to the first backrest 6, as described above, the forces received by the seating portion frame 5, at its rear edge, are partly absorbed by the first backrest 6, which is hinged to the seating portion frame 5 by means of the at least one pivoting connection 52.

However, as the at least one pivoting connection 52 is positioned only at the second backrest 6, the rear edge AR of the seating portion frame 5, on at least the second width portion W7, is cantilevered relative to the first width portion W6, which could affect its stability or even cause damage to the seating portion frame 5 from the effect of the forces received.

Due to the connection mechanism 100 of the seat 1 according to the present disclosure, and as can be seen more particularly in the exemplary embodiments of FIG. 9, the forces received by the seating portion frame 5 can be absorbed at its rear edge AR substantially along its entire width, in the transverse direction Y of the seat 1, partly by the at least one pivoting connection 52 of the first connection system 51, and partly by the connection mechanism 100. No portion of the seating portion frame 5 is cantilevered relative to another, which provides stability and reduces the risk of damage from the effect of the forces received.

The connection mechanism 100 also allows changing from one configuration to another by enabling movement of the seating portion frame 5 relative to the base 4 without causing a pivoting of the first backrest 6 or of the second backrest 7 relative to the base 4.

In particular, for this purpose, the connection mechanism 100 may be configured so that, during movement of the seating portion frame 5 relative to the base 4 in the longitudinal direction X and in the vertical direction Z of the seat 1, caused by the pivoting of the first backrest 6 relative to the base 4 about the first transverse axis Y1:

the connecting rod 101 pivots relative to the seating portion frame 5 at its first longitudinal end 102, about the third transverse axis Y102, the connecting rod 101 pivots relative to the base 4 at its second longitudinal end 103, about the fourth transverse axis Y103, the second longitudinal end 103 of the connecting rod 101 slides relative to the base 4 along the translation axis A104.

According to one embodiment, the connection mechanism 100 comprises a connecting rod 101 having two longitudinal ends 102, 103 with:

a first longitudinal end 102 hinged to the seating portion frame 5 at its rear edge AR, so as to pivot about a tenth transverse axis Y102 of the seat 1, and a second longitudinal end 103 hinged to the base 4 so as to pivot about an eleventh transverse axis Y103 of the seat 1 and movable relative to the base 4 so as to slide about a translation axis A104.

Such a design of the connection mechanism 100, as can be seen for example in the exemplary embodiments of FIGS. 9 to 13, is particularly simple and of reduced cost price.

The connecting rod 100 thus allows at least two degrees of freedom between the seating portion frame 5 and the base 4 in order to enable the movement of the seating portion frame 5 relative to the base 4 in the longitudinal direction X and the vertical direction Z of the seat 1.

As can be seen in the exemplary embodiments of FIGS. 9 and 10, the sliding axis A104 may advantageously be contained in a plane parallel to the plane (XZ) of the seat 1 and preferably inclined relative to the longitudinal X and vertical Z directions of the seat 1, particularly in the case where the base 4 is joined to the connection means 3.

The inclination of the translation axis A104 relative to the longitudinal X and vertical Z directions of the seat 1 as well as the path that the second longitudinal end 103 of the connecting rod 101 can travel along the translation axis A104 may advantageously be determined as a function of the different possible movements of the seating portion frame 5 relative to the base 4, possibly combined with the different possible movements of the base 4 relative to the connection means 3.

According to one embodiment, the first longitudinal end 102 is hinged to a side edge BL of the seating portion frame 5 so as to pivot about the tenth transverse axis Y102 of the seat 1.

In particular, and as can be seen more particularly in the exemplary embodiment of FIG. 9, the first longitudinal end 102 is hinged to the second side edge BL2 of the seating portion frame 5 defining the second width portion W7, in particular with the central edge BC, so as to pivot about the tenth transverse axis Y102 of the seat 1.

Advantageously, and in the case where the seating portion frame 5 also comprises a central edge BC interposed between the first side edge BL1 and the second side edge BL2 of the seating portion frame 5 along the transverse direction Y of the seat 1, and where the second backrest 7 extends substantially between the second side edge BL2 and the central edge BC of the seating portion frame 5, two connecting rods 101 may also be provided, in particular substantially identical and intended to move substantially in parallel during the movement of the seating portion frame 5 relative to the base 4, each connecting rod 101 being connected respectively to the second side edge BL2 and to the central edge BC of the seating portion frame 5, defining the second width portion W7.

According to one embodiment, the base 4 has a hole 104 oriented along the translation axis A104.

Advantageously, the second longitudinal end 103 of the connecting rod 101 may then be connected to the base 4 by means of a guide pin 105 received in the hole 104 and configured to slide in the hole 104 along the translation axis A104.

The hole 104 may for example be in the form of a through-hole, or of a non-piercing groove.

The hole 104 may advantageously be substantially rectilinear, as can be seen in the exemplary embodiment of FIG. 10, and may extend in the direction of the translation axis A104.

Advantageously, the hole 104 may be formed directly in the base 4, for example on a side flange 42 of the base, as can be seen in the embodiments of FIGS. 9 and 10.

According to one embodiment, the hole 104 is of substantially rectangular or oblong shape.

The guide pin 105 advantageously may then have a longitudinal slide-guiding portion 106 received in the hole 104, the hole 104 having a substantially rectangular cross-section.

Advantageously, and as can be seen more particularly in the exemplary embodiment of FIG. 13, the longitudinal slide-guiding portion 106 may have a width substantially equal to the width of the hole 104, excluding the sliding clearance.

Also, in order to prevent movement of the longitudinal guiding portion 106 of the guide pin 105, or even of the guide pin 105 as a whole, relative to the base 4 and possibly relative to the connecting rod 101, in the transverse direction Y of the seat 1, the guide pin 105 may also include two stop walls 108, positioned one on either side of the longitudinal slide-guiding portion 106 and configured to prevent the movement of the longitudinal slide-guiding portion 106, or of the guide pin 105 as a whole, relative to the base 4 and possibly relative to the connecting rod 101, in the transverse direction Y of the seat 1.

In particular, and for this purpose, the stop walls 108 may be provided with a width strictly greater than the width of the hole 104.

The stop walls 108 and/or the longitudinal slide-guiding portion 106 may be formed, at least in part, as one piece and integral with the guide pin 105. Alternatively, in order to facilitate the manufacture of the guide pin 105 or to facilitate its disassembly, for example for maintenance, they may be provided, at least in part, as elements separate from the guide pin 105 or even removable from the guide pin 105.

As can also be seen in the exemplary embodiment of FIG. 13, the guide pin 105 may also include a rotation-guiding portion 107, in particular of substantially cylindrical shape and of substantially circular cross-section, intended to be received so as to pivot about the eleventh transverse axis Y103 of the seat 1, within a housing 41 of corresponding substantially cylindrical shape, formed in the connecting rod 101 at the second longitudinal end 103 of the connecting rod 101.

Also, the connecting rod 101 may be hinged at its first longitudinal end 102 by means of a pin (not shown), physically representing the third transverse axis Y102 and having for example a threaded portion to enable its attachment to the second side edge BL2 of the seating portion frame 5.

According to one embodiment, and in particular in the case where:

the seating portion frame 5 has a central edge BC, substantially parallel to the side edges BL of the seating portion frame 5, and interposed between the first side edge BL1 and the second side edge BL2 along the transverse direction Y of the seat, and positioned so that the first width portion W6 extends substantially between the first side edge BL1 and the central edge BC of the seating portion frame 5 and so that the second width portion W7 extends substantially between the central edge BC and the second side edge BL2 of the seating portion frame 5, and the first connection system 51 has two tabs 53, each projecting respectively from the side edge BL and the central edge of the seating portion frame BC, defining the first width portion W6, the second longitudinal end E53' of the tabs 53 each being connected to the first backrest by a separate pivoting connection 52 along the third transverse axis Y2 of the seat, each at a separate side flange 61 of the first backrest 6, the first longitudinal end 102 of the connecting rod 101 of the connection mechanism 100 may be hinged to the second side edge BL2 of the seating portion frame 5, defining with the central edge BC the second width portion W7.

Thus, due to this advantageous arrangement of the present disclosure, the seating portion frame 5 is held in place at its rear edge AR on each of its side edges BL1, BL2, which prevents a part of the rear edge AR of the seating portion frame 5 from being cantilevered relative to another, and increases its stability and reduces the risks of damage from the effect of forces received.

The present disclosure also relates to a bench seat comprising at least one seat 1 according to one of the embodiments described above.

All of the arrangements and advantages described above for the seat 1 according to the present disclosure apply to such a bench seat.

In particular, and as explained above, such a bench seat offers a greater number of different possible configurations than what is conceivable with bench seats according to the second bench seat design described in the introduction to the present application, while representing a reduced cost price as well as greater simplicity and a greater speed of transition from one configuration to another compared to the first bench seat design described in the introduction to the present application.

As for the second bench seat design described in the introduction to the present application, the bench seat according to the present disclosure map may comprise, associated with the seat 1 according to the present disclosure configured to receive at least two users, a second seat configured to receive a single user, with a lower frame and at least one backrest, respectively independent of the lower frame 2 and of the backrests 6, 7 of the seat 1, positioned with the transverse hinging axis between its backrest and its lower frame substantially aligned with the first transverse axis Y1 or with the second transverse axis Y1' of the seat 1, and with its lower frame aligned with the lower frame 2 of the seat 1 along the transverse direction of the bench seat (then corresponding to the transverse direction Y of the seat 1.

Also, the backrest of the second seat may be designed to be substantially identical to the first backrest 6 of the seat 1, the second seat also being for example intended to be positioned near a side door of the vehicle (and in particular the other side of the vehicle along the transverse direction of the vehicle, then substantially corresponding to the transverse direction of the bench seat and to the transverse direction Y of the seat 1.

Such a bench seat may be referred to under the name 2/3, 1/3 bench seat, the seat 1 being designed to receive two users out of the three that the bench seat can receive, while the second seat is designed to receive one user out of the three that the bench seat can receive.

The second seat may also be provided with a design similar to that of the seat 1 according to the present disclosure, in other words with its backrest mounted to pivot relative to a base of its lower frame and with a seating portion frame mounted to be movable relative to the base and to the floor of the vehicle, according to kinematics similar to those of the seat 1 of the present disclosure, so as to be able to be placed in different configurations such as the nominal, dive down, single fold, easy entry, easy entry 2, and comfort configurations described above, which allows increasing the number of conceivable configurations for the bench seat according to the present disclosure.

Means may also be provided for synchronizing the movements of the various elements of the seat 1 with the movements of the various elements of the second seat, and in particular electronic synchronization means when these various movements are implemented via actuators, and in particular electric motors.

The bench seat according to the present disclosure may also include a plurality of seats 1, arranged with their first transverse axes Y1 aligned, and advantageously their respective second transverse axes Y1' as well.

The present disclosure also relates to a vehicle comprising a bench seat according to the present disclosure.

The vehicle may in particular be a motor vehicle.

According to one embodiment, the first backrest 6 of the at least one seat 1 of the bench seat of the vehicle is arranged closer to a side door of the vehicle than the second backrest 7, and the second backrest 7 is arranged substantially in the center of the vehicle, along a transverse direction of the vehicle, then substantially corresponding in particular to the transverse direction of the bench seat and to the transverse direction Y of the seat 1.

Lastly, the present disclosure relates to a method for adjusting the configuration of a seat 1 according to one of the embodiments described above, comprising at least a step of pivoting the second backrest 7 relative to the base 4 about the second transverse axis Y1' of the seat 1 from its at least one raised position to its folded position, with the first backrest 6 remaining in its at least one raised position and the seating portion frame 5 in its first position relative to the base 4.

Such a method for adjusting the configuration of a seat 1 is particularly simple and quick to implement in order to modify the configuration of the seat 1.

In particular, it allows transitioning the seat 1 from the nominal configuration to the single fold configuration.

All of the arrangements described above concerning the seat 1, or the bench seat receiving a seat 1, apply to the method according to the present disclosure, with identical advantages.

In particular, the provisions concerning the transition from one of the configurations of the seat 1 to another described above: nominal, comfort, easy entry, easy entry 2, dive down, single fold, also concern the method according to the present disclosure.

A vehicle may comprise at least one seat intended to accommodate a driver or a passenger of the vehicle, hereinafter referred to as a user. The seat may be intended to accommodate a single person or several people seated side by side, and may be arranged in the front or the rear of the vehicle. The seat may also be part of a bench seat that can accommodate several people side by side.

Within the meaning of the present disclosure, the term seat according to the present disclosure thus denotes a front seat of the vehicle as well as a rear seat of the vehicle. In the same manner, the term bench seat according to the present disclosure denotes a front seat of the vehicle as well as a rear seat of the vehicle. Similarly, the present disclosure may be implemented for seats of bench seats intended for any type of vehicle and in particular for motor vehicles.

A vehicle seat may comprise a lower frame, configured to be connected to the floor of a vehicle, in particular with means for connecting to the floor of the vehicle, generally in the form of two sliders arranged one on either side of the lower frame, each extending along a longitudinal axis of the seat, configured to be fixed to the floor of the vehicle and to enable the seat to slide along the longitudinal axis of the seat.

The seat also comprises at least one backrest, hinged to the lower frame so as to pivot about a first transverse axis Y1 of the seat, enabling the adjustment of its tilt relative to the lower frame.

Generally, a bench seat is provided to accommodate at least two or even three passengers positioned side by side, and may consist of a single seat or of a plurality of seats positioned side by side with the transverse axes Y1 hinging their respective backrests to their respective aligned lower frames.

Different designs may be used for a bench seat.

In a first comparative design, it may for example comprise two, or even three or more, structurally independent and contiguous seats whose first transverse axes Y1 of their respective backrests relative to their respective lower frames are aligned, each seat thus comprising a lower frame and a backrest, each configured to accommodate a single user.

The relative movements between the backrest and the lower frame of each seat as well as the relative movements between the lower frame and the floor of the vehicle are independent and advantageously decoupled between the different seats.

This first comparative design makes it possible to offer a high number of different configurations for the bench seat (depending on the position of the lower frame relative to the floor of the vehicle, for each seat, and depending on the position of the backrest relative to the lower frame, for each seat), but represents a high cost price as this corresponds to at least the sum of the cost of two or even three independent seats.

Also, with such a bench seat, changing from one configuration to another is complex and time consuming, as it is necessary to change the position of each backrest and each lower frame individually in order to achieve the desired configuration.

A second comparative design consists for example of a bench seat comprising a seat configured to accommodate at least two users, with a lower frame and a backrest hinged to the lower frame along a first transverse axis Y1 of the seat, the bench seat optionally comprising a second seat with a lower frame and at least one backrest hinged to the lower frame along a first transverse axis Y1 of the seat, respectively independent from the lower frame and backrest of the first seat.

This second comparative design advantageously reduces the cost price of the bench seat compared to the first bench seat design composed of fully independent seats. However, the number of different possible configurations for the bench seat is limited.

Thus, in order for example to increase the effective cargo volume in the vehicle receiving the bench seat, it may be advantageous to have a first configuration of the bench seat in which the lower frame of the at least one seat, or of each seat, is moved relative to the floor of the vehicle in the vertical direction and/or in the longitudinal direction of the seat so as to be closer to the floor of the vehicle, at least in the vertical direction of the seat, and in which each of the backrests is also pivoted relative to the lower frame, about the first transverse axis Y1 of the seat.

For this purpose, it is provided that for each seat of the bench seat, the pivoting of the backrest or of each of the backrests about the first transverse axis Y1 of the seat causes movement of the lower frame of the seat relative to the floor of the vehicle in the vertical direction and/or in the longitudinal direction of the seat.

This first configuration can be obtained with suitable kinematics with the first design or with the second design described above.

However, it may also be desirable to be able to benefit from a second configuration of the bench seat in which a single backrest, configured to receive a single user, is pivoted relative to the lower frame about the first transverse axis Y1 of the seat, without this causing either the pivoting of another backrest, also configured to receive a single user, relative to the lower frame about the first transverse axis Y1 of the seat, or movement of the lower frame relative to the floor of the vehicle in the vertical direction and/or in the longitudinal direction of the seat, particularly in the case where the bench seat forms a separation between the trunk of the vehicle and the passenger compartment and it is necessary to provide access between the trunk and the passenger compartment, for example to be able to transport long objects, such as wooden boards or skis, which are placed in the trunk but protrude into the passenger compartment, while still allowing at least one user to sit on the bench seat.

The first design of the bench seat described above, providing several seats each configured to receive a single user, each with an independent lower frame and backrest, allows these different configurations to be obtained but as explained above has a high cost price, and a high complexity and execution time for switching from one configuration to another.

The second design of the bench seat described above, providing at least one seat configured to accommodate at least two users, with a single lower frame configured to receive at least two users to which is hinged a single backrest, also configured to receive at least two users, does not make it possible to obtain the second configuration described above, in particular it does not provide two backrests that are independent in their movement relative to the lower frame.

The present disclosure overcomes these disadvantages of vehicle seats configured to receive at least two users and advantageously being part of a vehicle bench seat, by providing a vehicle seat configured to accommodate at least two users which allows obtaining several configurations for the bench seat of which it is a part, and in particular the two configurations described above, while making it possible to switch simply and quickly from one configuration to another.

Another object of the present disclosure is to provide such a vehicle seat that is of simple design and a low cost price.

A vehicle seat is proposed that is configured to accommodate at least two users, comprising:

a lower frame, intended to be connected to the floor of a vehicle, for example by means of connection means comprising in particular sliders, having:

a base, intended to be connected to the floor of the vehicle, for example by means of connection means comprising in particular sliders, and a seating portion frame, comprising at least two seating places to accommodate at least two users, having a front edge and a rear edge interconnected by a first side edge and a second side edge, a first backrest hinged to the base of the lower frame so as to pivot about a first transverse axis Y1 of the seat, extending along a first width portion of the seating portion frame in the transverse direction of the seat, and configured to pivot relative to the base about the first transverse axis Y1 between at least one raised position and a folded position, a second backrest hinged to the base of the lower frame so as to pivot about a second transverse axis Y1' of the seat, which in particular may be coincident with the first transverse axis Y1, the second backrest extending along a second width portion of the seating portion frame in the transverse direction of the seat, and configured to pivot relative to the base about the second transverse axis Y1' between at least one raised position and a folded position.

According to the present disclosure, the seat further comprises a first connection system connecting the first backrest to the seating portion frame, configured so that the pivoting of the first backrest relative to the base about the first transverse axis Y1 between the at least one raised position and the folded position causes the simultaneous movement of the seating portion frame relative to the base in the longitudinal direction X and the vertical direction Z of the seat between a first position and a second position, in the two pivoting directions of the first backrest relative to the base, about the first transverse axis Y1 of the seat.

According to optional features of the present disclosure, taken alone or in combination:

the second backrest is configured to pivot relative to the base about the second transverse axis Y1', independently of the pivoting of the first backrest relative to the base about the first transverse axis Y1, at least in order to enable the second backrest to be folded down from the at least one raised position to the folded position with the first backrest remaining in the raised position, and without causing the simultaneous movement of the seating portion frame relative to the base;

the second backrest is connected to the base by means of a second connection system configured so that the movement of the second backrest relative to the base is independent of the movement of the seating portion frame relative to the base, the second connection system comprising for example only a pivoting connection along the second transverse axis Y1' of the seat between the second backrest and the base;

the first connection system between the first backrest and the seating portion frame comprises a pivoting connection along a third transverse axis Y2 of the seat, distinct from the first transverse hinging axis Y1 between the first backrest and the base, connecting the first backrest and the seating portion frame, near its rear edge;

the first connection system comprises a tab provided on the seating portion frame, projecting from the rear edge of the seating portion frame, the tab having two longitudinal ends, with:

a first longitudinal end integral to the seating portion frame, at the rear edge of the seating portion frame, and a second longitudinal end connected to the first backrest by means of the pivoting connection along the third transverse axis Y2 of the seat;

the seating portion frame has a central edge, substantially parallel to the first side edge and to the second side edge of the seating portion frame, and interposed between the first side edge and the second side edge along the transverse direction of the seat, and positioned so that the first width portion extends substantially between the first side edge and the central edge of the seating portion frame and so that the second width portion extends substantially between the central edge and the second side edge of the seating portion frame, the first connection system having two tabs, each projecting respectively from the first side edge and the central edge of the seating portion frame, defining the first width portion, the second longitudinal end of the tabs each being connected to the first backrest by means of a separate pivoting connection along the third transverse axis Y2 of the seat, each at a separate side flange of the first backrest;

each tab is provided as one piece, and integral with respectively the first side edge and the central edge of the seating portion frame;

the pivoting connection along the third transverse axis Y2 of the seat is positioned such that the third transverse axis Y2 is located above the first transverse axis Y1 of the seat hinging the first backrest and the seating portion frame, in the vertical direction of the seat, and the distance separating the first transverse axis Y1 from the third transverse axis Y2 preferably being between 50 cm and 70 cm;

the lower frame further has connection means configured to connect the lower frame to the floor of the vehicle, comprising for example two sliders arranged one on either side of the lower frame, each extending along a longitudinal axis of the seat and configured to enable movement in translation of the seat relative to the floor of the vehicle in the longitudinal direction, the seating portion frame is connected to the connection means by at least one connecting rod having two longitudinal ends, the first longitudinal end of the connecting rod being hinged to the connection means so as to pivot about a fourth transverse axis Y3 of the seat and the second longitudinal end of the connecting rod being hinged to the seating portion frame, at its front edge, so as to pivot about a fifth transverse axis Y4 of the seat, and:

the forward pivoting of the first backrest relative to the base about the first transverse axis Y1 of the seat causes the forward pivoting of the connecting rod about the fourth transverse axis Y3 of the seat so as to move the front edge of the seating portion frame relative to the connection means, at least in the vertical direction of the seat, and vice versa, the rearward pivoting of the first backrest relative to the base about the first transverse axis Y1 of the seat causes the rearward pivoting of the connecting rod about the fourth transverse axis Y3 of the seat so as to move the front edge of the seating portion frame relative to the connection means, at least in the vertical direction of the seat;

the base is mounted to be movable relative to the connection means in the longitudinal direction and the vertical direction of the seat, so as to be able to move closer to or away from the connection means;

the base is connected to the connection means by at least two connecting rods aligned along a longitudinal axis X1, X2 of the seat, each connecting rod having two longitudinal ends, the first longitudinal end of each connecting rod being hinged to the connection means so as to pivot respectively about a sixth transverse axis Y5 of the seat and a seventh transverse axis Y6 of the seat, and the second longitudinal end of each connecting rod being hinged to the base so as to pivot respectively about an eighth transverse axis Y7 of the seat and a ninth transverse axis Y8 of the seat;

the first width portion has a width, in the transverse direction of the seat, that is strictly greater than the width of the second width portion, in the transverse direction of the seat, preferably between 1.5 and 2.5 times greater;

the seat further comprises locking means configured to lock the tilt of the first backrest relative to the base about the first transverse axis Y1 of the seat.

According to another aspect, a vehicle bench seat is proposed comprising at least one seat according to the present disclosure.

Also proposed is a vehicle comprising a bench seat according to the present disclosure.

According to one embodiment of the vehicle, the first backrest of the at least one seat of the bench seat is arranged closer to a side door of the vehicle than the second backrest, and the second backrest is arranged substantially in the center of the vehicle, along a transverse direction of the vehicle.

Finally, a method is proposed for adjusting the configuration of a seat according to the present disclosure, comprising at least a step of folding down the second backrest about the second transverse axis Y1' of the seat from the at least one raised position towards the folded position, with the first backrest remaining in the raised position and the seating portion frame in the first position relative to the base.

The features set forth in the following paragraphs may optionally be implemented. They may be implemented independently of one another or in combination with one another.

The following numbered clauses include embodiments that are contemplated and non-limiting:

Clause 1. A vehicle seat configured to accommodate at least two users, comprising:

a lower frame (2), intended to be connected to the floor of a vehicle, for example by means of connection means (3) comprising in particular sliders (31), having:

a base (4), intended to be connected to the floor of the vehicle, for example by means of connection means (3) comprising in particular sliders (31), and a seating portion frame (5), comprising at least two seating places to accommodate at least two users, having a front edge (AV) and a rear edge (AR) interconnected by a first side edge (BL1) and a second side edge (BL2), a first backrest (6) hinged to the base (4) of the lower frame (2) so as to pivot about a first transverse axis (Y1) of the seat (1), extending along a first width portion (W6) of the seating portion frame (5) in the transverse direction (Y) of the seat (1), and configured to pivot relative to the base (4) about the first transverse axis (Y1) between at least one raised position and a folded position, a second backrest (7) hinged to the base (4) of the lower frame (2) so as to pivot about a second transverse axis (Y1') of the seat (1), able in particular to be coincident with the first transverse axis (Y1), the second backrest (7) extending along a second width portion (W7) of the seating portion frame (5) in the transverse direction (Y) of the seat (1), and configured to pivot relative to the base (4) about the second transverse axis (Y1') between at least one raised position and a lowered position, wherein the seat (1) further comprises a first connection system (51) connecting the first backrest (6) to the seating portion frame (5), configured so that the pivoting of the first backrest (6) relative to the base (4) about the first transverse axis (Y1) between the at least one raised position and the folded position causes the simultaneous movement of the seating portion frame (5) relative to the base (4) in the longitudinal direction (X) and the vertical direction (Z) of the seat (1) between a first position and a second position, in the two pivoting directions of the first backrest (6) relative to the base (4), about the first transverse axis (Y1) of the seat (1).

Clause 2. The seat (1) according to clause 1, wherein the second backrest (7) is configured to pivot relative to the base (4) about the second transverse axis (Y1'), independently of the movement of the seating portion frame (5) relative to the base (4) in the longitudinal direction (X) and the vertical direction (Z), driven, by means of the first connection system (51), by the pivoting of the first backrest (6) relative to the base (4) about the first transverse axis (Y1), at least to enable the second backrest (7) to be folded down from the at least one raised position to the folded position with the first backrest (6) remaining in the raised position, and without causing the simultaneous movement of the seating portion frame (5) relative to the base (4).

Clause 3. The seat (1) according to clause 2, wherein the second backrest (7) is connected to the base (4) by means of a second connection system (71) configured so that the movement of the second backrest (7) relative to the base (4) is independent of the movement of the seating portion frame (5) relative to the base (4), the second connection system (71) comprising for example only a pivoting connection along the second transverse axis (Y1') of the seat (1) between the second backrest (7) and the base (4).

Clause 4. The seat (1) according to one of clauses 1 to 3, wherein the first connection system (51) between the first backrest (6) and the seating portion frame (5) comprises a pivoting connection (52) along a third transverse axis (Y2) of the seat (1), distinct from the first transverse hinging axis (Y1) between the first backrest (6) and the base (4), connecting the first backrest (6) and the seating portion frame (5), near its rear edge (AR).

Clause 5. The seat (1) according to clause 4, wherein the first connection system (51) comprises a tab (53) provided on the seating portion frame (5), projecting from the rear edge (AR), the tab (53) having two longitudinal ends (E53, E53'), with:

a first longitudinal end (E53) integral to the seating portion frame (5), at the rear edge (AR) of the seating portion frame (5), and a second longitudinal end (E53') connected to the first backrest (6) by means of the pivoting connection (52) along the third transverse axis (Y2) of the seat (1).

Clause 6. The seat (1) according to clause 5, wherein the seating portion frame (5) has a central edge (BC), substantially parallel to the first side edge (BL1) and to the second side edge (BL2) of the seating portion frame (5), and interposed between the first side edge (BL1) and the second side edge (BL2) along the transverse direction (Y) of the seat (1), and positioned so that the first width portion (W6) extends substantially between the first side edge (BL1) and the central edge (BC) of the seating portion frame (5) and so that the second width portion (W7) extends substantially between the central edge (BC) and the second side edge (BL2) of the seating portion frame (5), and wherein the first connection system (51) has two tabs (53), each projecting respectively from the first side edge (BL1) and the central edge (BC) of the seating portion frame (5), defining the first width portion (W6), the second longitudinal end (E53') of the tabs (53) each being connected to the first backrest (6) by means of a separate pivoting connection (52) along the third transverse axis (Y2) of the seat (1), each at a separate side flange (61) of the first backrest (6).

Clause 7. The seat according to clause 6, wherein each tab (53) is provided as one piece, and integral with respectively the first side edge (BL1) and the central edge (BC) of the seating portion frame (5).

Clause 8. The seat (1) according to one of clauses 4 to 7, wherein the pivoting connection (52) along the third transverse axis (Y2) of the seat (1) is positioned such that the third transverse axis (Y2) is located above the first transverse axis (Y1) of the seat (1) hinging the first backrest (6) and the seating portion frame (5), in the vertical direction (Z) of the seat (1), the distance separating the first transverse axis (Y1) from the third transverse axis (Y2) preferably being between 50 cm and 70 cm.

Clause 9. The seat according to one of clauses 1 to 8, wherein the lower frame (2) further has connection means (3) configured to connect the lower frame (2) to the floor of the vehicle, comprising for example two sliders (31) arranged one on either side of the lower frame (2), each extending along a longitudinal axis (X1, X2) of the seat (1) and configured to enable movement in translation of the seat (1) relative to the floor of the vehicle in the longitudinal direction.

Clause 10. The seat (1) according to clause 9, wherein the seating portion frame (5) is connected to the connection means (3) by at least one connecting rod (8) having two longitudinal ends (81, 82), wherein the first longitudinal end (81) of the connecting rod (8) is hinged to the connection means (3) so as to pivot about a fourth transverse axis (Y3) of the seat (1) and the second longitudinal end (82) of the connecting rod (8) is hinged to the seating portion frame (5), at its front edge (AV), so as to pivot about a fifth transverse axis (Y4) of the seat (1), and wherein:

the forward pivoting of the first backrest (6) relative to the base (4) about the first transverse axis (Y1) of the seat (1) causes the forward pivoting of the connecting rod (8) about the fourth transverse axis (Y3) of the seat (1) so as to move the front edge (AV) of the seating portion frame (5) relative to the connection means (3), at least in the vertical direction (Z) of the seat (1), and vice versa, the rearward pivoting of the first backrest (6) relative to the base (4) about the first transverse axis (Y1) of the seat (1) causes the rearward pivoting of the connecting rod (8) about the fourth axis transverse (Y3) of the seat (1) so as to move the front edge (AV) of the seating portion frame (5) relative to the connection means (3), at least in the vertical direction (Z) of the seat (1).

Clause 11. The seat (1) according to clause 9 or 10, wherein the base (4) is mounted to be movable relative to the connection means (3) in the longitudinal direction (X) and the vertical direction (Z) of the seat (1), so as to be able to move closer to or away from the connection means (3).

Clause 12. The seat (1) according to clause 11, wherein the base (4) is connected to the connection means (3) by at least two connecting rods (9, 10) aligned along a longitudinal axis (X1, X2) of the seat (1), each connecting rod (9, 10) having two longitudinal ends (91, 92; 11, 12), wherein the first longitudinal end (91, 11) of each connecting rod (9, 10) is hinged to the connection means (3) so as to pivot respectively about a sixth transverse axis (Y5) of the seat (1) and a seventh transverse axis (Y6) of the seat (1), and the second longitudinal end (92, 12) of each connecting rod (9, 10) is hinged to the base (4) so as to pivot respectively about an eighth transverse axis (Y7) and a ninth transverse axis (Y8) of the seat (1).

Clause 13. The seat (1) according to one of clauses 1 to 12, wherein the first width portion (W6) has a width (L6), in the transverse direction (Y) of the seat (1), that is strictly greater than to the width (L7) of the second width portion (W7), in the transverse direction (Y) of the seat (1), preferably between 1.5 and 2.5 times greater.

Clause 14. The seat (1) according to one of clauses 1 to 13, further comprising locking means (62) configured to lock the tilt of the first backrest (6) relative to the base (4) about the first transverse axis (Y1) of the seat (1).

Clause 15. A vehicle bench seat comprising at least one seat (1) according to one of clauses 1 to 14.

Clause 16. A vehicle comprising a bench seat according to clause 15.

Clause 17. A vehicle according to clause 16, wherein the first backrest (6) of the at least one seat (1) of the bench seat is arranged closer to a side door of the vehicle than the second backrest (7), and the second backrest (7) is arranged substantially in the center of the vehicle, along a transverse direction of the vehicle.

Clause 18. A method for adjusting the configuration of a seat (1) according to one of clauses 1 to 14, comprising at least one step of pivoting the second backrest (7) relative to the base (4) about the second transverse axis (Y1') of the seat (1) from its at least one raised position to its folded position, with the first backrest (6) remaining in its at least one raised position and the seating portion frame (5) in its first position relative to the base (4).

The invention claimed is:

1. A vehicle seat configured to accommodate at least two users, the vehicle seat comprising:
  a lower frame, intended to be connected to the floor of a vehicle having:
    a base, intended to be connected to the floor of the vehicle and
    a seating portion frame, comprising at least two seating places to accommodate at least two users, having a front edge and a rear edge interconnected by a first side edge and a second side edge,
  a first backrest hinged to the base of the lower frame so as to pivot about a first transverse axis of the seat, extending along a first width portion of the seating portion frame in the transverse direction of the seat, and configured to pivot relative to the base about the first transverse axis between at least one raised position and a folded position,
  a second backrest hinged to the base of the lower frame so as to pivot about a second transverse axis of the seat, able in particular to be coincident with the first transverse axis, the second backrest extending along a second width portion of the seating portion frame in the transverse direction of the seat, and configured to pivot relative to the base about the second transverse axis between at least one raised position and a lowered position,
  wherein the seat further comprises a first connection system connecting the first backrest to the seating portion frame, configured so that the pivoting of the first backrest relative to the base about the first transverse axis between the at least one raised position and the folded position causes the simultaneous movement of the seating portion frame relative to the base in the longitudinal direction and the vertical direction of the seat between a first position and a second position, in the two pivoting directions of the first backrest relative to the base, about the first transverse axis of the seat.

2. The seat of claim 1, wherein the second backrest is configured to pivot relative to the base about the second transverse axis, independently of the movement of the seating portion frame relative to the base in the longitudinal direction and the vertical direction, driven, by means of the first connection system, by the pivoting of the first backrest relative to the base about the first transverse axis, at least to enable the second backrest to be folded down from the at least one raised position to the folded position with the first backrest remaining in the raised position, and without causing the simultaneous movement of the seating portion frame relative to the base.

3. The seat of claim 2, wherein the second backrest is connected to the base by means of a second connection system configured so that the movement of the second backrest relative to the base is independent of the movement of the seating portion frame relative to the base.

4. The seat of claim 3, wherein the second connection system comprises only a pivoting connection along the second transverse axis of the seat between the second backrest and the base.

5. The seat of claim 1, wherein the first connection system between the first backrest and the seating portion frame comprises a pivoting connection along a third transverse axis of the seat, distinct from the first transverse hinging axis between the first backrest and the base, connecting the first backrest and the seating portion frame, near its rear edge.

6. The seat of claim 5, wherein the first connection system comprises a tab provided on the seating portion frame, projecting from the rear edge, the tab having two longitudinal ends, with:
a first longitudinal end integral to the seating portion frame, at the rear edge of the seating portion frame, and
a second longitudinal end connected to the first backrest by means of the pivoting connection along the third transverse axis of the seat.

7. The seat of claim 5, wherein the pivoting connection along the third transverse axis of the seat is positioned such that the third transverse axis is located above the first transverse axis of the seat hinging the first backrest and the seating portion frame, in the vertical direction of the seat, the distance separating the first transverse axis from the third transverse axis preferably being between 50 cm and 70 cm.

8. The seat of claim 6, wherein the seating portion frame has a central edge, substantially parallel to the first side edge and to the second side edge of the seating portion frame, and interposed between the first side edge and the second side edge along the transverse direction of the seat, and positioned so that the first width portion extends substantially between the first side edge and the central edge of the seating portion frame and so that the second width portion extends substantially between the central edge and the second side edge of the seating portion frame, and wherein the first connection system has two tabs, each projecting respectively from the first side edge and the central edge of the seating portion frame, defining the first width portion, the second longitudinal end of the tabs each being connected to the first backrest by means of a separate pivoting connection along the third transverse axis of the seat, each at a separate side flange of the first backrest.

9. The seat of claim 8, wherein each tab is provided as one piece, and integral with respectively the first side edge and the central edge of the seating portion frame.

10. The seat of claim 1, wherein the lower frame further has connection means configured to connect the lower frame to the floor of the vehicle.

11. The seat of claim 10, wherein the seating portion frame is connected to the connection means by at least one connecting rod having two longitudinal ends, wherein the first longitudinal end of the connecting rod is hinged to the connection means so as to pivot about a fourth transverse axis of the seat and the second longitudinal end of the connecting rod is hinged to the seating portion frame, at its front edge, so as to pivot about a fifth transverse axis of the seat, and wherein:
the forward pivoting of the first backrest relative to the base about the first transverse axis of the seat causes the forward pivoting of the connecting rod about the fourth transverse axis of the seat so as to move the front edge of the seating portion frame relative to the connection means, at least in the vertical direction of the seat, and vice versa,
the rearward pivoting of the first backrest relative to the base about the first transverse axis of the seat causes the rearward pivoting of the connecting rod about the fourth axis transverse of the seat so as to move the front edge of the seating portion frame relative to the connection means, at least in the vertical direction of the seat.

12. The seat of claim 10, wherein the base is mounted to be movable relative to the connection means in the longitudinal direction and the vertical direction of the seat, so as to be able to move closer to or away from the connection means.

13. The seat of claim 12, wherein the base is connected to the connection means by at least two connecting rods aligned along a longitudinal axis of the seat, each connecting rod having two longitudinal ends, wherein the first longitudinal end of each connecting rod is hinged to the connection means so as to pivot respectively about a sixth transverse axis of the seat and a seventh transverse axis of the seat, and the second longitudinal end of each connecting rod is hinged to the base so as to pivot respectively about an eighth transverse axis and a ninth transverse axis of the seat.

14. The seat of claim 10, wherein the connection means comprises two sliders arranged one on either side of the lower frame, each extending along a longitudinal axis of the seat and configured to enable movement in translation of the seat relative to the floor of the vehicle in the longitudinal direction.

15. The seat of claim 1, wherein the first width portion has a width, in the transverse direction of the seat, that is strictly greater than to the width of the second width portion, in the transverse direction of the seat, preferably between 1.5 and 2.5 times greater.

16. The seat of claim 1, further comprising locking means configured to lock the tilt of the first backrest relative to the base about the first transverse axis of the seat.

17. A vehicle bench seat comprising at least one seat according to claim 1.

18. A vehicle comprising a bench seat according to claim 17.

19. The vehicle of claim 18, wherein the first backrest of the at least one seat of the bench seat is arranged closer to a side door of the vehicle than the second backrest, and the second backrest is arranged substantially in the center of the vehicle, along a transverse direction of the vehicle.

20. A method for adjusting the configuration of a seat according to claim 1, comprising at least one step of pivoting the second backrest relative to the base about the second transverse axis of the seat from its at least one raised position to its folded position, with the first backrest remaining in its at least one raised position and the seating portion frame in its first position relative to the base.

* * * * *